US008851947B2

(12) United States Patent
Vlock et al.

(10) Patent No.: US 8,851,947 B2
(45) Date of Patent: Oct. 7, 2014

(54) INFLATABLE WATERCRAFT WITH BATTERY POWERED MOTORIZED CASSETTE

(75) Inventors: Michael Vlock, Branford, CT (US); Leonard Stobar, Pasadena, CA (US)

(73) Assignee: Boomerboard, LLC, Branford, CT (US)

( * ) Notice: Subject to any disclaimer, the term of this patent is extended or adjusted under 35 U.S.C. 154(b) by 182 days.

(21) Appl. No.: 13/605,122

(22) Filed: Sep. 6, 2012

(65) Prior Publication Data
US 2013/0059489 A1 Mar. 7, 2013

Related U.S. Application Data

(60) Provisional application No. 61/531,914, filed on Sep. 7, 2011.

(51) Int. Cl.
*A63C 5/03* (2006.01)
*B63B 7/08* (2006.01)
(Continued)

(52) U.S. Cl.
CPC . *B63H 21/17* (2013.01); *B63J 3/02* (2013.01); *B63B 7/085* (2013.01); *B60L 1/003* (2013.01); *B63H 2021/216* (2013.01); *B63H 21/30* (2013.01); *Y02T 10/705* (2013.01); *B63B 2003/382* (2013.01); *B63H 2011/081* (2013.01); *Y02T 10/7005* (2013.01); *Y02T 10/642* (2013.01); *B60L 2200/32* (2013.01); *B60L 11/1805* (2013.01); *B60L 11/1877* (2013.01); *B63H 20/12* (2013.01); *B63H 2011/008* (2013.01); *B63H 11/08* (2013.01); *B60L 2240/421* (2013.01); *B60L 2270/40* (2013.01); *B63B 35/7913* (2013.01); *B63H 2021/307* (2013.01); *B63B 35/7943* (2013.01); *B60L 2270/145* (2013.01); *B63B 2003/387* (2013.01); *B63H 21/21* (2013.01)
USPC .......................................................... 441/74

(58) Field of Classification Search
USPC ...................................... 440/6, 32, 38; 441/74
See application file for complete search history.

(56) References Cited

U.S. PATENT DOCUMENTS

| 1,667,912 A | 5/1928 | Vlahon |
| 3,262,413 A | 7/1966 | Douglas et al. |

(Continued)

FOREIGN PATENT DOCUMENTS

| DE | 2155978 | 5/1971 |
| DE | 2017747 | 1/1972 |

(Continued)

OTHER PUBLICATIONS

PCT Invitation to Pay Additional Fees, and Where Applicable, Protest Fee (Form PCT/ISA/206) in International Application No. PCT/US2012/053801, filed Sep. 5, 2012, mailed Dec. 12, 2012.

(Continued)

*Primary Examiner* — Lars A Olson
*Assistant Examiner* — Jovon Hayes
(74) *Attorney, Agent, or Firm* — Knobbe Martens Olson & Bear LLP

(57) ABSTRACT

An inflatable watercraft comprises a motorized cassette and at least one inflatable chamber. The at least one inflatable chamber is foldable relative to the motorized cassette at least when the inflatable watercraft is in a deflated configuration. The motorized cassette includes a motor, an impeller, at least one battery, and a pump configured to inflate the at least one inflatable chamber. The pump can include a reversible pump configured to deflate the at least one inflatable chamber.

25 Claims, 32 Drawing Sheets

(51) Int. Cl.
- *B60L 1/00* (2006.01)
- *B63H 21/30* (2006.01)
- *B60L 11/18* (2006.01)
- *B63H 20/12* (2006.01)
- *B63B 35/79* (2006.01)
- *B63H 21/17* (2006.01)
- *B63J 3/02* (2006.01)
- *B63H 21/21* (2006.01)
- *B63B 3/38* (2006.01)
- *B63H 11/08* (2006.01)
- *B63H 11/00* (2006.01)

(56) References Cited

U.S. PATENT DOCUMENTS

| | | | |
|---|---|---|---|
| 3,536,025 A | 10/1970 | Tierney | |
| 3,548,778 A | 12/1970 | Von Smagala-Romanoff | |
| 3,929,549 A | 12/1975 | Smith | |
| 4,020,782 A | 5/1977 | Gleason | |
| 4,538,996 A | 9/1985 | Inwood | |
| 4,811,682 A | 3/1989 | Hwang et al. | |
| 4,883,436 A | 11/1989 | Oakland | |
| 4,998,494 A * | 3/1991 | Deutsch | 114/39.14 |
| 5,017,166 A * | 5/1991 | Chang | 440/7 |
| 5,090,930 A | 2/1992 | Walden | |
| 5,282,437 A | 2/1994 | Avillez De Basto | |
| 5,396,860 A | 3/1995 | Cheng | |
| 5,429,562 A * | 7/1995 | Milner | 482/51 |
| 5,474,481 A | 12/1995 | Ramsey | |
| 5,582,529 A | 12/1996 | Montgomery | |
| 5,590,616 A | 1/1997 | Vera | |
| 5,769,674 A * | 6/1998 | Stallman | 440/38 |
| 5,807,152 A | 9/1998 | Wojcik | |
| 5,943,978 A | 8/1999 | Garnier | |
| 5,947,788 A | 9/1999 | Derrah | |
| 6,135,837 A * | 10/2000 | Giles | 441/79 |
| 6,142,840 A | 11/2000 | Efthymiou | |
| 6,178,911 B1 | 1/2001 | Hemphill | |
| 6,183,333 B1 | 2/2001 | Hall | |
| 6,250,977 B1 * | 6/2001 | Ness | 440/38 |
| 6,305,305 B1 | 10/2001 | Johnson | |
| 6,305,307 B1 | 10/2001 | Yokoya | |
| 6,311,631 B1 | 11/2001 | Beecher | |
| 6,394,867 B1 | 5/2002 | Del Bianco | |
| 6,409,560 B1 | 6/2002 | Austin | |
| 6,461,204 B1 | 10/2002 | Takura et al. | |
| 6,568,340 B2 * | 5/2003 | Dec et al. | 114/55.56 |
| 6,662,742 B2 | 12/2003 | Shelton et al. | |
| 6,702,634 B2 * | 3/2004 | Jung | 441/74 |
| 6,793,552 B2 | 9/2004 | Derrah | |
| 6,823,813 B2 | 11/2004 | Mazin | |
| 6,901,872 B1 * | 6/2005 | Battle et al. | 114/55.56 |
| 7,121,911 B1 | 10/2006 | Hickman | |
| 7,198,532 B2 | 4/2007 | Field | |
| 7,226,329 B2 * | 6/2007 | Railey | 441/74 |
| 7,267,586 B1 * | 9/2007 | Murphy | 440/32 |
| 7,513,808 B1 * | 4/2009 | Murphy | 440/32 |
| 7,662,006 B2 * | 2/2010 | Mollis | 441/65 |
| 7,711,322 B2 | 5/2010 | Rhodes et al. | |
| 7,731,555 B2 | 6/2010 | Railey | |
| 7,963,814 B2 * | 6/2011 | Grimmeisen | 440/6 |
| 7,993,178 B2 | 8/2011 | Railey | |
| 8,290,636 B2 | 10/2012 | Manning | |
| 8,398,446 B2 * | 3/2013 | Railey et al. | 441/74 |
| 2001/0042498 A1 * | 11/2001 | Burnham | 114/55.56 |
| 2002/0072285 A1 | 6/2002 | Jung | |
| 2003/0167991 A1 * | 9/2003 | Namanny | 114/55.56 |
| 2006/0292942 A1 | 12/2006 | Liao | |
| 2008/0045097 A1 * | 2/2008 | Railey | 441/74 |
| 2008/0168937 A1 | 7/2008 | Ruan et al. | |
| 2009/0165690 A1 * | 7/2009 | Walworth et al. | 114/55.5 |
| 2011/0056423 A1 * | 3/2011 | Railey | 114/55.56 |
| 2011/0201238 A1 * | 8/2011 | Rott et al. | 440/6 |
| 2011/0212691 A1 | 9/2011 | Rott et al. | |
| 2011/0256518 A1 | 10/2011 | Rott | |
| 2012/0126972 A1 | 5/2012 | Rott et al. | |
| 2012/0196494 A1 | 8/2012 | Preston | |
| 2013/0005199 A1 * | 1/2013 | Railey | 440/6 |
| 2013/0059489 A1 * | 3/2013 | Vlock et al. | 440/6 |

FOREIGN PATENT DOCUMENTS

| | | |
|---|---|---|
| DE | 3139816 | 5/1983 |
| DE | 20 2006 00021 | 3/2006 |
| DE | 10 2004 04961 | 4/2006 |
| FR | 2617793 | 1/1989 |
| GB | 2032871 | 5/1980 |
| JP | 61125992 | 6/1986 |
| JP | 01148694 | 6/1989 |
| JP | 2002-154479 | 5/2002 |
| JP | 2002 193185 | 7/2002 |
| JP | 2003 026085 | 1/2003 |

OTHER PUBLICATIONS

PCT International Preliminary Report on Patentability in International Application No. PCT/US2012/053801, filed Sep. 5, 2012, dated Mar. 12, 2014.

PCT International Search Report and Written Opinion in International Application No. PCT/US20121053801, filed Sep. 5, 2012, dated Oct. 11, 2013.

* cited by examiner

INFLATABLE WATERCRAFT WITH BATTERY POWERED MOTORIZED CASSETTE

CROSS-REFERENCE TO RELATED APPLICATIONS

This application claims the benefit of U.S. Provisional Application No. 61/531,914 filed on Sep. 7, 2011, entitled "INFLATABLE WATERCRAFT WITH BATTERY POWERED MOTORIZED CASSETTE," which is hereby incorporated by reference in its entirety.

BACKGROUND OF THE INVENTION

1. Field of the Invention

The present invention relates to inflatable watercrafts.

2. Description of the Related Art

Watercrafts are used around the world for various purposes including, transportation, fishing, recreation, and/or living spaces. Watercrafts can be motorized or non-motorized. Some watercrafts can be fitted with separate motor assemblies, for example, an outboard motor, to provide motorized propulsion capability to an otherwise non-motorized vessel. Other watercrafts can be constructed with one or more inboard motors. Also, some watercrafts, including sailboats, rowboats, kayaks, and canoes, may be used primarily without motors.

SUMMARY OF THE INVENTION

In one embodiment, an inflatable watercraft having at least an inflated configuration and a deflated configuration is provided. The watercraft comprises a motorized cassette comprising a watercraft drive system contained in a housing and at least one inflatable chamber. The motorized cassette comprises at least one battery, a pump, a motor operatively coupled to the battery, and an impeller operatively coupled to the motor. No components of the watercraft drive system protrude from the housing. The at least one inflatable chamber is fluidly coupled to the pump.

In another embodiment, a deflatable watercraft has at least an inflated configuration and a deflated configuration. The watercraft comprises a motorized cassette comprising a watercraft drive system comprising an impeller, a motor, and a battery enclosed within a housing, wherein no components of the watercraft drive system protrude from the housing. A deflatable watercraft body is attached to the motorized cassette and is configured to fold onto or around the motorized cassette to form a portable unit comprising the watercraft and the motorized cassette.

In another embodiment, a method of operating an inflatable watercraft, comprises inflating at least one inflatable chamber of a watercraft body with a pump, wherein the pump is contained within a motorized cassette attached to the watercraft body, propelling the watercraft with a watercraft drive system within the motorized cassette, and deflating the at least one inflatable chamber with the pump.

In another embodiment, a motorized cassette for a watercraft is provided, comprising a housing and a watercraft drive system. The housing comprises a base attached to a cover along a perimeter to form an inner volume. A vibratory weld seals the base to the cover along the perimeter. The watercraft drive system comprises at least one battery, a motor operatively coupled to the battery, and an impeller operatively coupled to the motor. The battery and the motor are sealed within the inner volume.

For purposes of summarizing the invention and the advantages achieved over the prior art, certain objects and advantages of the invention have been described above and as further described below. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

These and other aspects of the invention will be readily apparent from the following description and from the appended drawings (not necessarily to scale), which are meant to illustrate and not to limit the invention, and in which.

DETAILED DESCRIPTION OF THE PREFERRED EMBODIMENT

Traditionally, smaller watercrafts have been used in conjunction with larger watercrafts in emergency situations and/or to transfer passengers or equipment to and from the larger watercraft. For example, inflatable watercrafts, dinghies, life rafts, or tenders may be used to evacuate passengers safely from a larger watercraft and/or to transport passengers from the larger watercraft to a dock, or another large watercraft, in a marina or other setting. However, these smaller watercrafts must be tied to the larger watercraft when not in use and/or require a significant space on the larger watercraft for storage.

The general purpose of many embodiments described herein is to provide an inflatable watercraft. In some embodiments, an inflatable watercraft may be easily stowed in a deflated configuration, for example, in a bag, suitcase, or other compartment, on a larger watercraft. Such an inflatable watercraft may be utilized in emergency situations and/or for transportation to and from the larger watercraft. In some advantageous embodiments, the inflatable watercraft can incorporate a battery powered motor module. The motor module can be used to propel the watercraft, inflate the watercraft, and/or deflate the watercraft. In these embodiments, the inflatable watercraft does not require a separate motor for propulsion and/or a separate pump for inflation and/or deflation. In some embodiments, a cassette may house batteries, motors, control electronics, impellers and associated drive hardware, and one or more reversible pumps. The one or more pumps and the impellers can be driven by one or more common motors that are operatively coupled to one or more batteries.

The following figures and associated discussion describe and illustrate one embodiment of a motorized cassette in a variety of other watercraft. A similar cassette of the same or different shape can be used also as part of an inflatable watercraft as also described further below. The terminology used in the description presented herein is not intended to be interpreted in any limited or restrictive manner, simply because it is being utilized in conjunction with a detailed description of certain specific embodiments disclosed herein. Furthermore, embodiments disclosed herein may include several novel features, no single one of which is solely responsible for its desirable attributes or which is essential to the embodiments herein described.

Figure 1:
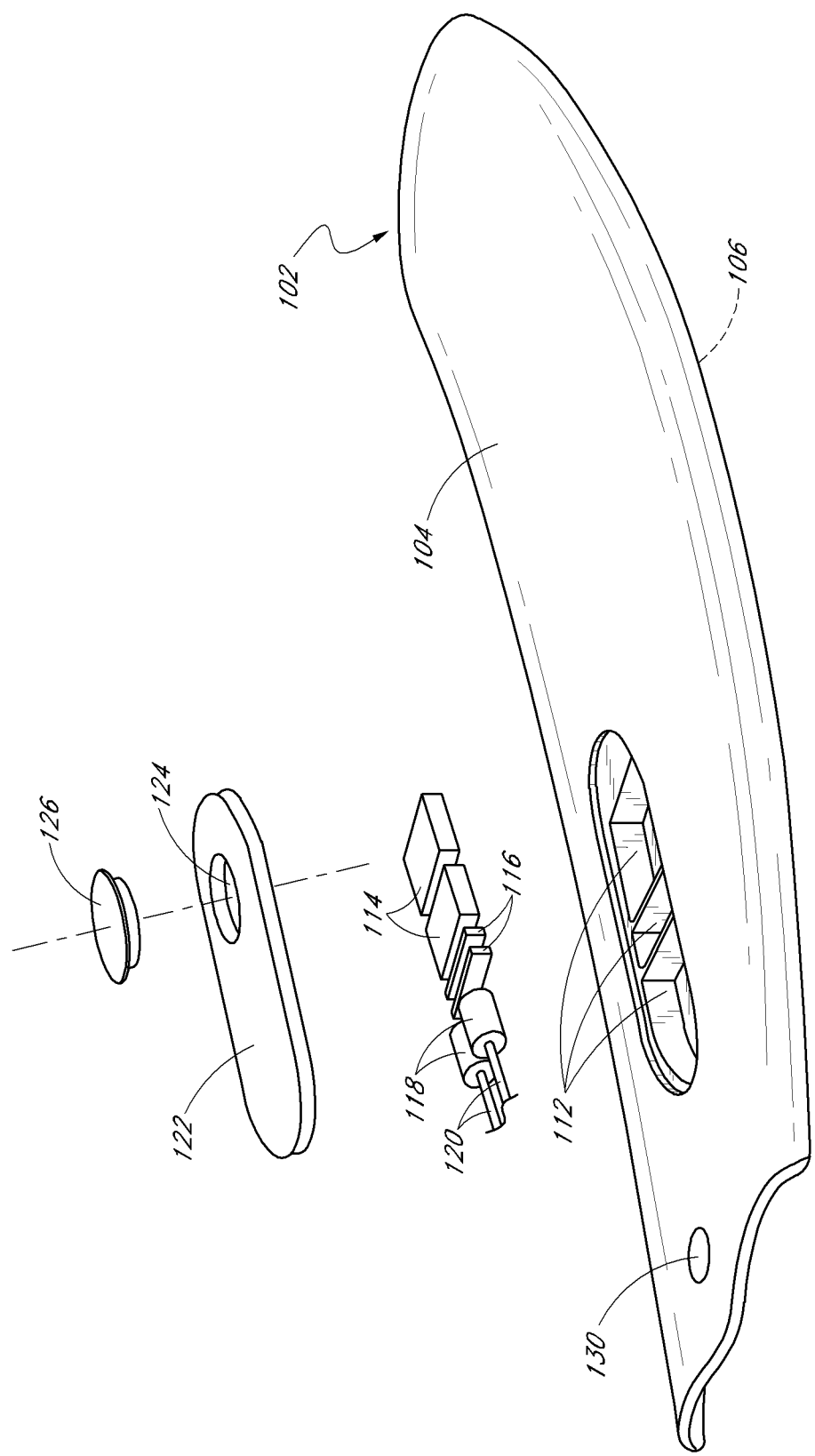
FIG. 1 is an exploded view of a top shell of a surfboard showing components placed in top shell recesses.
Figure 2:
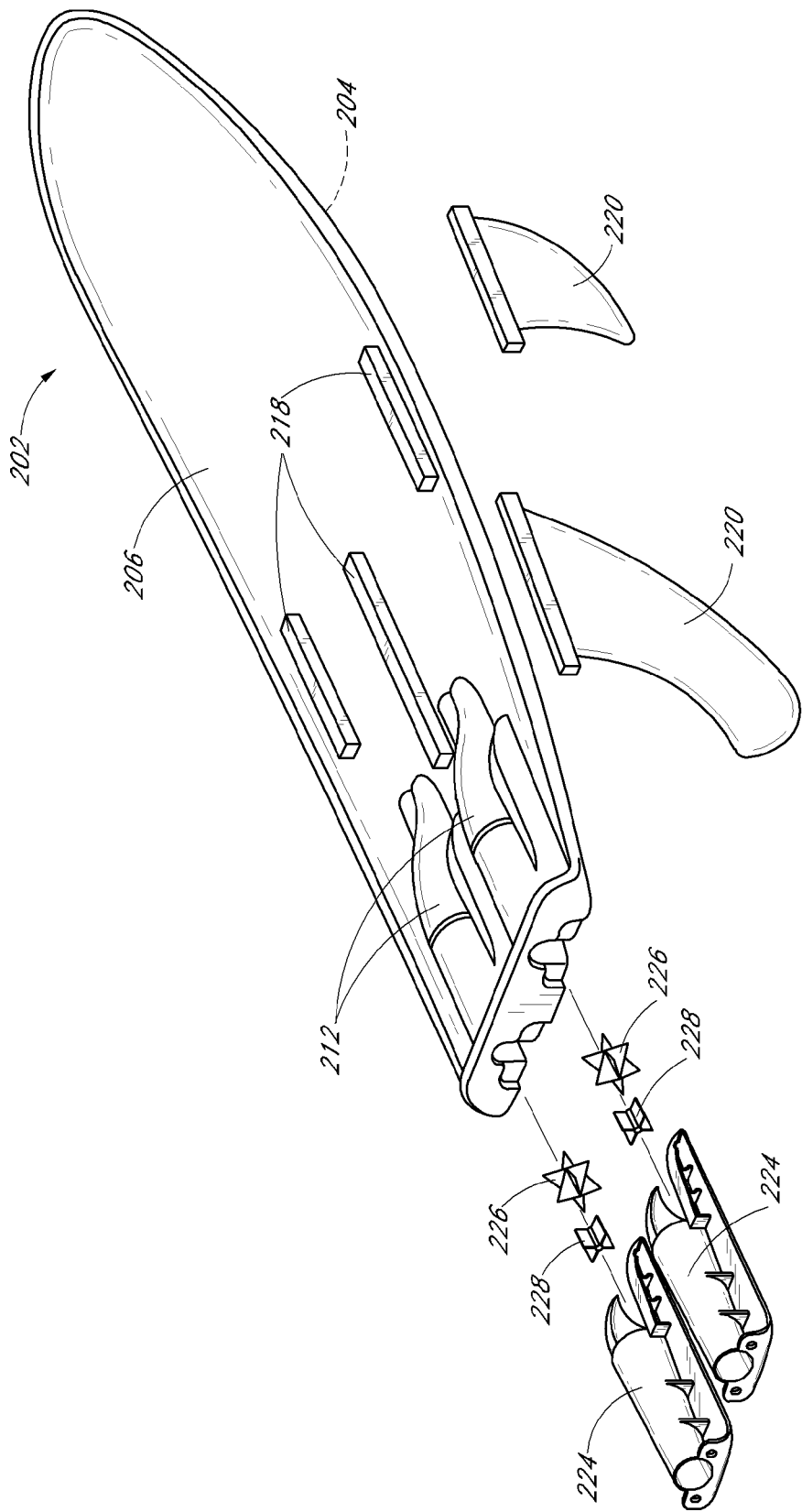
FIG. 2 is an exploded view of a bottom shell of a surfboard showing components placed in bottom shell recesses.
Figure 3:
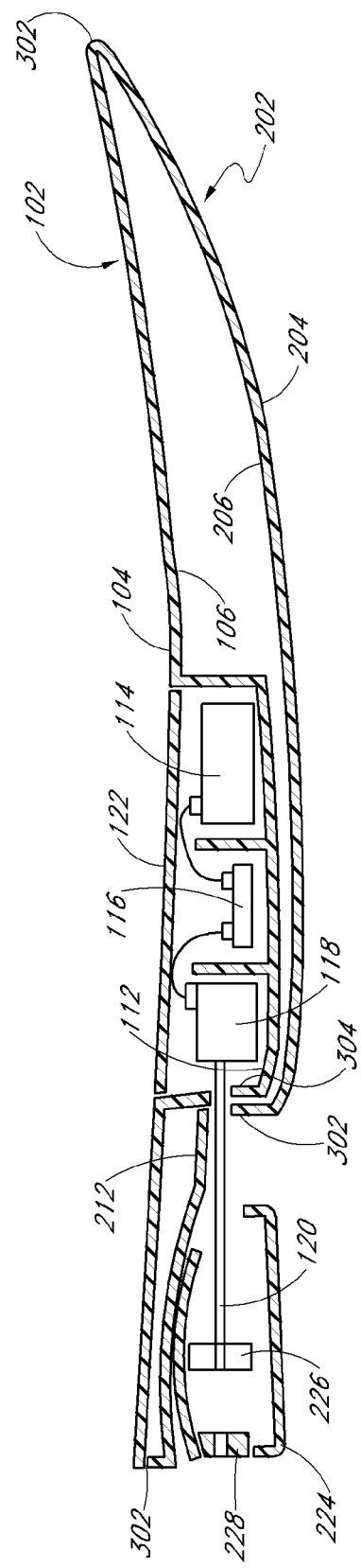
FIG. 3 is a cutaway view of a surfboard made from top and bottom shells with power components mounted therein in accordance with one embodiment of the invention.

FIGS. 1-6 illustrate suitable power and drive train components for a motorized watercraft such as a surfboard. In these Figures, the components are not placed in a cassette, but these Figures illustrate the components themselves and their relative placement and function. Referring now to FIGS. 1, 2, and 3, in some embodiments, a motorized surfboard comprises a top shell 102, and a bottom shell 202. This hollow shell construction has been recently utilized for surfboard manufacture, and represents a departure from traditional shaped foam boards. It is one aspect of the invention that this hollow shell design has been adapted to a motorized surfboard in a manner that minimizes manufacturing costs and provides structural integrity and long term reliability.

The top shell 102 is illustrated in FIG. 1, and the bottom shell 202 is illustrated in FIG. 2. In FIG. 3, a conceptual cutaway view is provided showing how the shells mate with each other in one embodiment.

The top shell 102 has an outer surface 104, and an inner surface 106. Similarly, the bottom shell has an outer surface 204, and an inner surface 206. To produce the complete surfboard body, the two shells are sealed together along a seam 302 that extends around the periphery of the top and bottom shells. The "outer surface" of the top and bottom shells are the surfaces that are contiguous with the surfaces exposed to the water in use (although not all of the "outer surface" of the shells is actually exposed to water as will be seen further below). The "inner surface" of the top and bottom shells are the surfaces internal to the hollow board after sealing into a hollow surfboard body. The general methods of producing surfboards with this hollow shell technique are known in the art. Currently, Aviso Surfboards (www.avisosurf.com) manufactures surfboards in this manner from carbon fiber top and bottom shells forming a hollow surfboard body.

The outer surface 104 of the top shell 102 is formed with one or more recessed portions 112, where the recessed portions extend generally toward the inner surface 206 of the bottom shell 202 when the shells are sealed together into a hollow body. The recessed portions 112 form compartments for batteries 114, motor controller boards 116, and motors 118. The motors 118 are coupled to shafts 120 that extend out the rear of the motor compartment as will be explained further below.

After installation of these components, the recesses can be sealed with a cover 122 that can be secured in place with adhesive such as caulking or other water resistant sealant. If desired, an internally threaded access port 124 can be provided that receives an externally threaded cover 126. This can provide easier access than removing or cutting the adhesive on the larger cover 122. In some advantageous embodiments, one or both of the covers 122, 126 are clear so that the batteries, motors, and/or other electronics can be seen when they surfboard is sealed up and in use. Another threaded plug 130 can also be provided, which can be used to ensure equal air pressures on the inside and outside of the hollow body. This feature is well known and normally utilized for hollow shell surfboards.

Turning now to FIG. 2, the outer surface 204 of the bottom shell 202 also includes one or more recessed portions 212, where the recessed portions extend generally toward the inner surface 106 of the top shell 102 when the shells are sealed together into a hollow surfboard body. The bottom shell 202 may also contain recesses 218 for fin boxes that accept fins 220 in a manner known in the art. The bottom shell recesses 212 are configured to accept pump housings 224. As shown in FIG. 3, the pump housings 224 receive the motor shafts 120, onto which an impeller 226 is attached. At the rear of the pump housing 224, a flow straightener 228 may be attached.

As shown in FIG. 3, the recessed portion 112 in the top shell and the recessed portion 212 in the bottom shell comprise walls 302 in the bottom shell and 304 in the top shell that are proximate to one another. In advantageous embodiments, these proximate walls extend approximately perpendicular to the overall top and bottom surfaces of the surfboard. In these proximate walls are substantially aligned openings, through which the motor shaft 120 extends. Thus, the motor(s) 118, which reside in a recessed portion of the top shell, are coupled to the impeller(s) that reside in the pump housing(s) that in turn reside in a recessed portion of the bottom shell.

Figure 4:
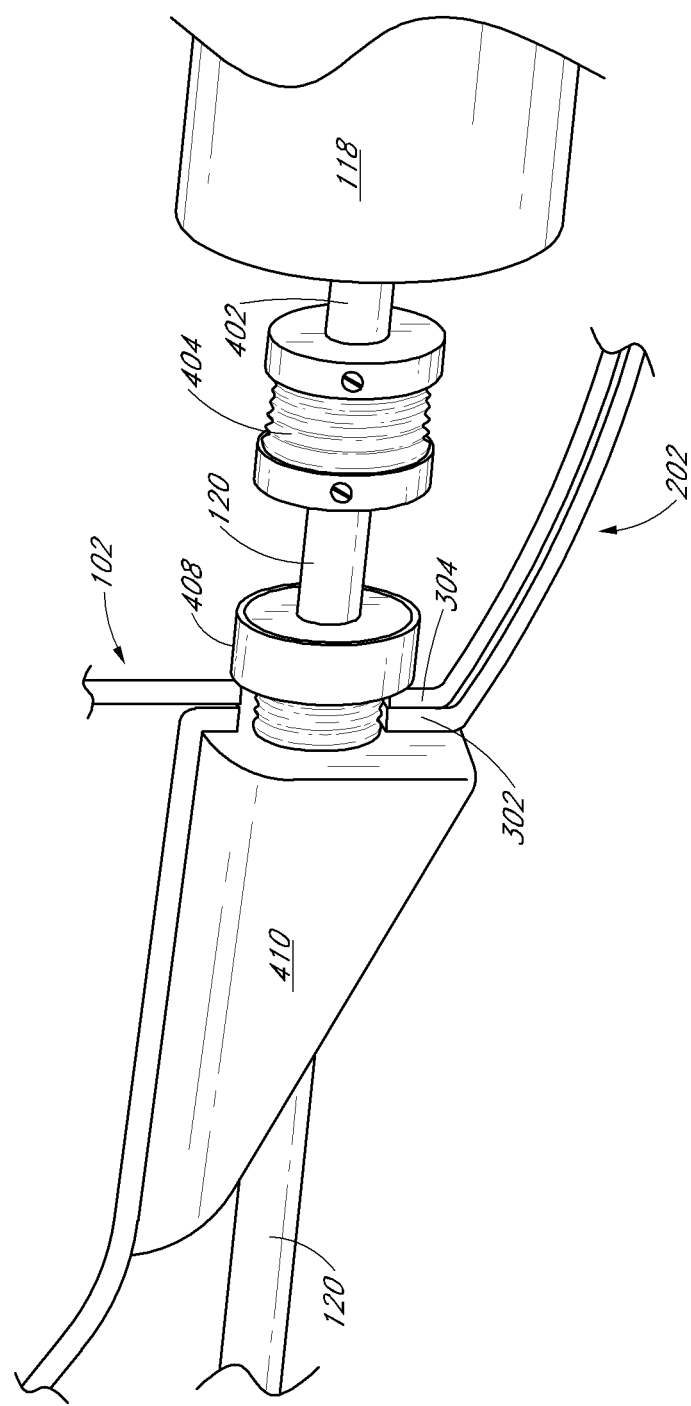
FIG. 4 shows a detailed view of a passageway between a motor recess in a top shell and an impeller recess in a bottom shell.

FIG. 4 illustrates in more detail the surfaces 302 and 304 through which the motor shaft 120 extends. Typically, the motor 118 includes an integral shaft 402 of fairly short extent. This short shaft may be coupled to a longer extended motor shaft 120 with a bellows coupler 404. These couplers 404 are commercially available, from for example, Ruland, as part number MBC-19-6-6-A. The bellows coupling 404 is advantageous because it allows for smooth shaft rotation even in the presence of vibrations and/or small deviations in linearity of the connection. The long shaft 120 then extends through a bearing 408 which has a threaded rear portion. The threaded rear portion of the bearing 408 is threaded into a threaded insert 410 that is positioned on the other side of the openings, in the recessed portion of the bottom shell. When the bearing is tightened into the insert, a water tight seal is created as the walls 302 and 304 are compressed together. It will be appreciated that the walls 302, 304 may directly touch, or they may remain separated, with or without additional material between. To further minimize any potential for leakage, it is possible to place washers of rubber, polymer, or the like between the insert 410 and the wall 320, and/or between the bearing 408 and the wall 304.

Figure 5:
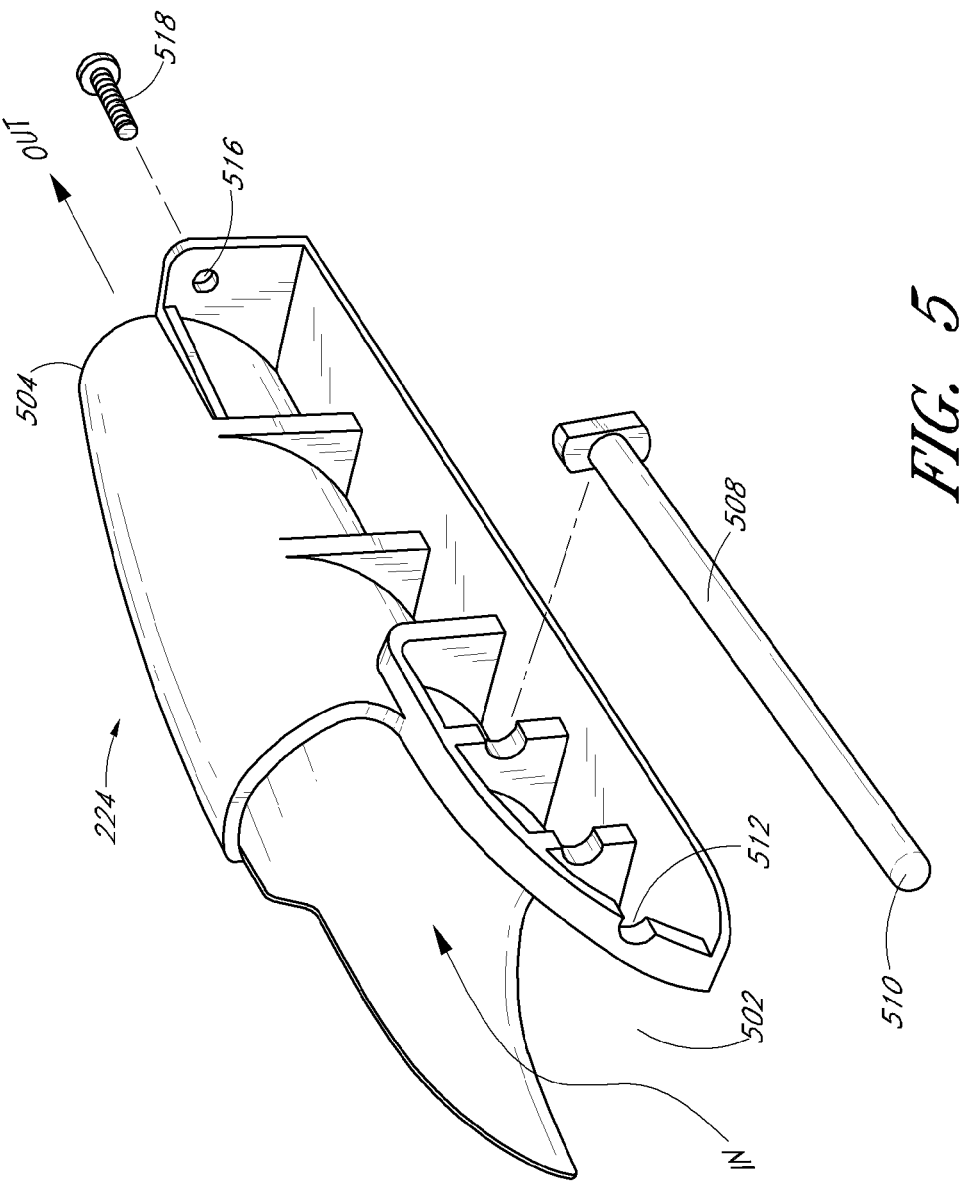
FIG. 5 is a perspective view of a flow housing in which the impeller may be inserted.
Figure 6:
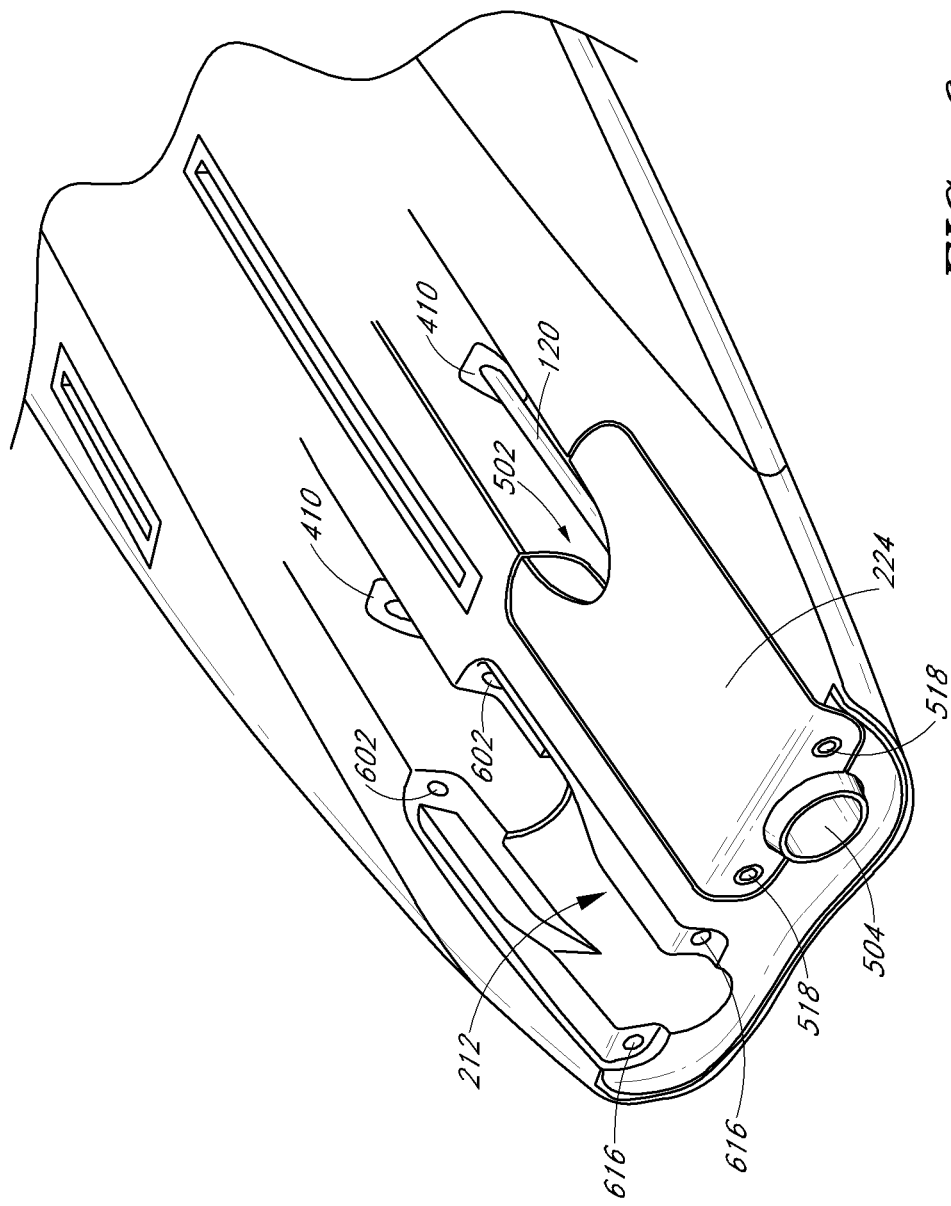
FIG. 6 illustrates the bottom shell attached to the top shell in the region of the surfboard tail with one flow housing attached in one of the bottom shell recesses.

FIGS. 5 and 6 illustrate the positioning of the pump housing 224 in the recessed portion 212 of the bottom shell. FIG. 5 illustrates the underside of the pump housing 224 and FIG. 6 illustrates a pump housing installed in a recess of the bottom shell. The pump housing 224 is basically a hollow tube for directing water up to the impeller and out the rear of the surfboard. Thus, the pump housing comprises an inlet port 502 and an exhaust port 504. The pump housing 224 can be secured in the recess 212 in a variety of ways. The embodiment of FIGS. 5 and 6 includes shafts 508 that are secured to each side of the pump housing. The tip 510 of the shaft 508 extends through an opening 512 in the frontward of the pump housing 224. Referring now to FIG. 6, these exposed tips 510 are placed in holes 602 in the recess to secure the pump housing into the frontward portion of the recess 212. The rear of the pump housing may comprise a wall with holes that mate with holes 616 in the bottom shell. The holes in the bottom shell may be provided with press fit threaded inserts. Screws 518 can then be used to secure the rear of the pump housing 224 to the rear of the recess 212.

It will be appreciated that the pump housing 224 can be secured in the recess 212 in a variety of ways. For example, instead of having holes in the bottom shell for screws and pins, slots and/or blind recesses can be formed in or adhesively attached to the side surfaces of the recess that engage mating surfaces on the pump housing. Such structures can also be provided with threads for engaging screw connections. As another alternative, adhesive could be used to secure the pump housing in place.

Turning now to the power and control electronics and devices illustrated in FIGS. 1 and 3, a wide variety of power sources, motor controllers, and motors may be utilized. They can be secured in their respective recesses on metal frames and/or plates (not shown) that are secured in the recesses with adhesive and/or with fasteners such as screws to structures in the recesses integral to the side walls or adhesively secured thereto. Acceptable sources of power include a lithium battery or plurality of lithium batteries.

To avoid a hard wired connection to the motor controllers 116 from a throttle control input, the motor controller 116 advantageously include a wireless receiver. This receiver can communicate with a wireless transmitter that is controlled by the surfer in order to control the motor speed. Wireless throttle controls have been used extensively, but using a throttle while surfing poses unique issues in that paddling, standing, and riding waves will interfere with a surfer's ability to easily manipulate a control mechanism such as a trigger, a dial, or the like. In one embodiment, wireless transmission circuitry can be configured to transmit electromagnetic and/or magnetic signals underwater. Because one or both transmitter and receiver can be under the surface of the ocean during much of the duration of surfing, a transmission system and protocol that is especially reliable in these conditions may be used. For example, wireless circuitry can be implemented in accordance with the systems and methods disclosed in U.S. Pat. No. 7,711,322, which is hereby incorporated by reference in its entirety. As explained in this patent, it can be useful to use a magnetically coupled antenna operating in a near field regime. A low frequency signal, e.g. less than 1 MHz, can further improve underwater transmission reliability. With this type of throttle system, an automatic shut off may be implemented, where if the signal strength between the transmitter and receiver drops below a certain threshold, indicating a certain distance between the two has been exceeded, the receiver shuts off the electric motor. This is useful as an automatic shut off if the surfer falls off the board.

Figure 7:
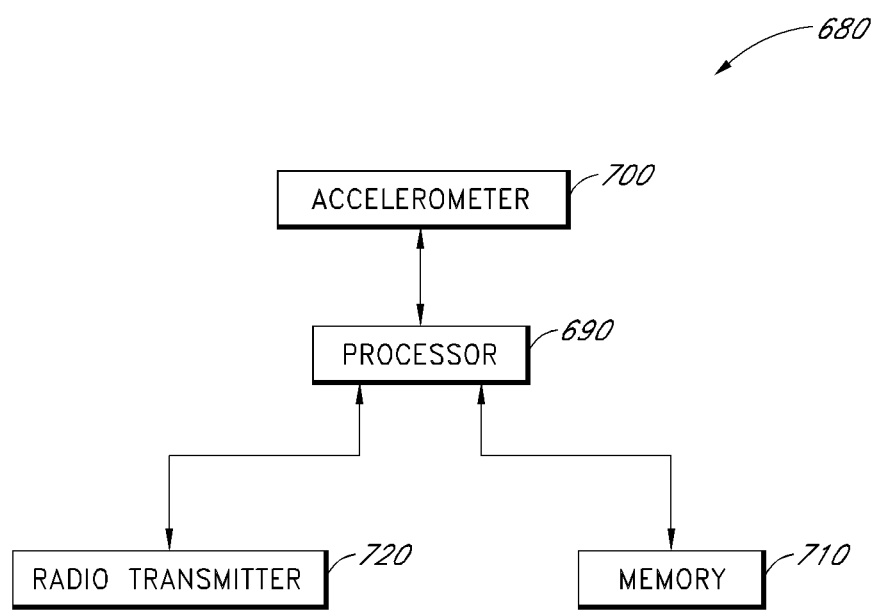
FIG. 7 is a block drawing showing one embodiment of a drive control system, which may be used in one embodiment of the motorized surfboard.

FIG. 7 illustrates an alternative control mechanism 680 for controlling a motorized surfboard. Control mechanism 680 has a processor 690 for coordinating the operation of the control mechanism 680. The processor 690 is coupled to an accelerometer 700. The accelerometer 700 measures acceleration. These measurements are communicated to processor 690. Processor 690 may also communicate with accelerometer 700 for the purpose of initializing or calibrating accelerometer 700. In one embodiment, accelerometer 700 is a 3-axis accelerometer and can measure acceleration in any direction. Processor 690 is also coupled to memory 710. In one example, memory 710 is used to store patterns or profiles of accelerometer readings which have been associated with particular motor control commands. For example, memory 710 may store a pattern of accelerometer readings which has been previously associated with a command to cause the motor controller to activate the motors. The processor 690 can compare the current accelerometer 700 outputs to the previously stored profiles to determine whether the current outputs should be interpreted as a motor command. Control mechanism 680 also has a radio transmitter 720 coupled to the processor 690. In one embodiment, radio transmitter 720 transmits information received from processor 690, such as motor commands, to radio receiver 504.

Figure 8:
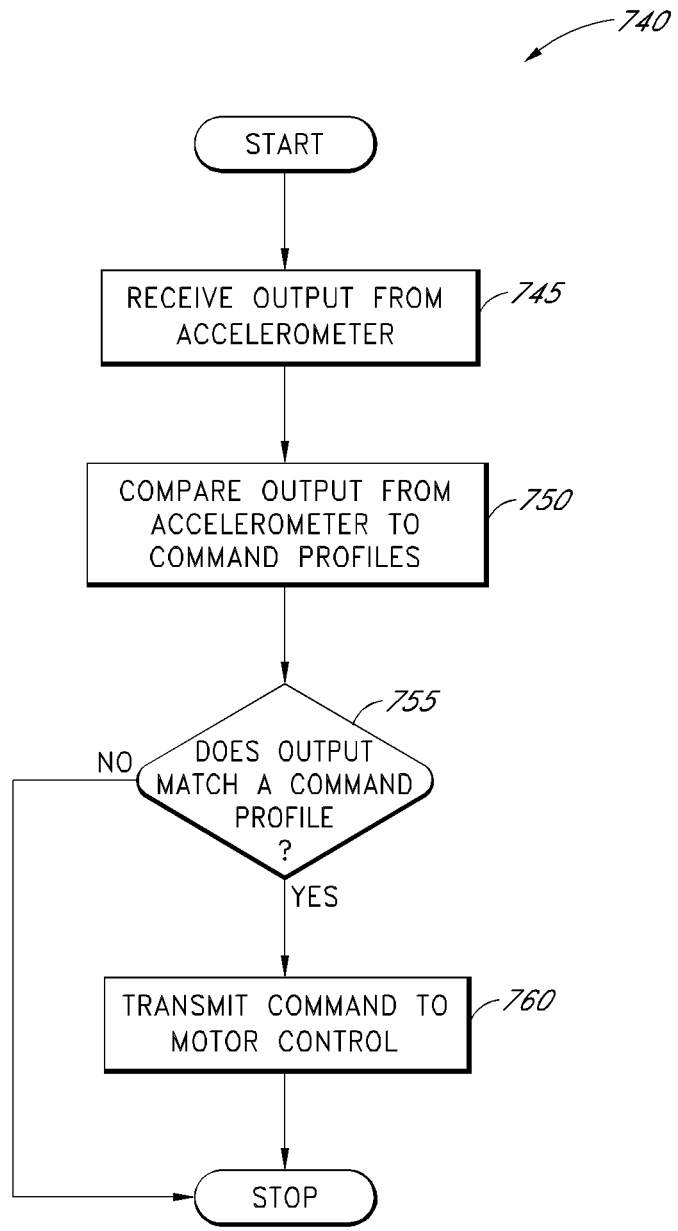
FIG. 8 is a flow chart illustrating a method for use with one embodiment of the motorized surfboard.

FIG. 8 illustrates a method 740 for using control mechanism 680, consistent with one embodiment of the invention. At step 745, output is received from the accelerometer. In one embodiment, the output from the accelerometer may be an analog signal representative of the acceleration measured along each axis measured by the accelerometer. In another embodiment, an analog to digital converter may be used to convert the output to a digital representation of the analog signal. Alternatively, the accelerometer may be configured to output digital signals. For example, the accelerometer itself may be configured to output a digital pulse when the acceleration detected on each axis exceeds some threshold amount.

After the output from the accelerometer is received, the control mechanism compares the output to pre-determined command profiles as show in step 750. These command profiles may also be referred to as accelerometer output patterns or simply as patterns. For example, the control mechanism may store a pattern corresponding to a repeated positive and negative acceleration substantially along a particular axis. Another pattern may correspond to an isolated positive acceleration along a particular axis. The patterns of accelerometer outputs may be associated with particular commands for the motor controllers. For example one pattern may correspond to a command to activate a subset of the available motors. Another pattern may correspond to a command to activate one or more available motors with a particular duty cycle or at a particular percentage of maximum operation potential.

The comparison of the current accelerometer output to the command profile results in a determination of whether the output matches a particular command profile, as shown in step 755. In one embodiment, if the current output does not match a command profile, the output from the accelerometer is discarded and the method concludes, leaving the control mechanism to wait for more output from the accelerometer. However, if the current output does match a command profile, the control mechanism transmits the corresponding command to the motor controllers, as shown in step 760. After the transmission, the command mechanism may again wait for additional output from the accelerometer.

Figure 9:
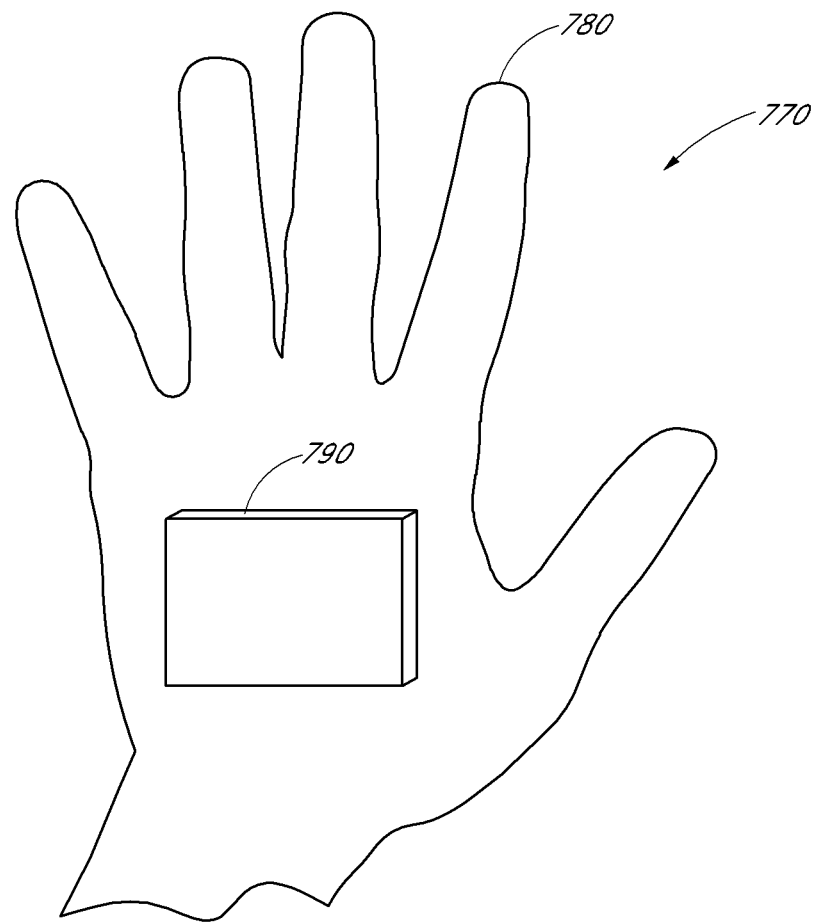
FIG. 9 is a flow a top view of one embodiment of a drive control system, which may be used in one embodiment of the motorized surfboard.

In alternative embodiments, the control mechanism may operate without the need for pattern comparison. For example, in one embodiment, the control mechanism may be configured to interpret accelerometer readings as a proxy for throttle control. In one embodiment, the magnitude and duration of the accelerometer output may be directly translated into magnitude and duration signals for the motor controllers. For example, an acceleration reading above a particular threshold may be interpreted as a command to activate the motors. The duration of the command may be a proportional to the duration for which the acceleration reading is received. FIG. 9 illustrates one possible embodiment for the control mechanism 680. In this embodiment the control mechanism is encapsulated in a package 790 which is integrated into a glove 780. It will be appreciated by one of ordinary skill in the art that the term integrated into the glove may comprise being attached to the surface or within the structure of glove 780. In one embodiment the package 790 is a water tight package. In one embodiment, package 790 comprises a plastic box. In another embodiment, package 790 comprises layers of fabric or other materials. Advantageously this embodiment facilitates control of the motorized surfboard while maintaining the ability of the surfer to use his hands for normal surfing activity. For example, rather than positioning one hand on throttle 620 to control the motorized surfboard, the normal motion of the surfer's hand, while wearing the glove, may be used to control the motorized surfboard. For example, it may be desirable for the motor controller to activate the motors while the surfer would normally be paddling. This may be when the surfer is paddling out or when the surfer is attempting to position himself to catch a wave. Accordingly, when the control mechanism is embedded in a glove 780, the control mechanism may be configured to recognize the acceleration experienced by a surfer's hand during the paddling motion as a command to engage the motors. Thus, the surfer is free to use his hands for normal surfing activity while the control mechanism activates the motors when the surfer's hand motions indicate that the surfer is performing an activity which would be aided by additional motor support. Alternatively, the control mechanism may be configured to activate the motors in response to patterns which, though not necessarily surfing related, require less effort or distraction than involved in manually manipulating a throttle. For example, while riding a wave, rather than adjusting a throttle, the surfer wearing glove 780 might simply shake his hand to engage or disengage the motor. Accordingly, the surfer is able to control the motors of the surfboard with less effort and coordination than would be required to manipulate the throttle embedded in body of the surfboard. In an alternative embodiment, the packaged control mechanism 790 may also be attached to or integrated into a wrist strap of other clothing or accessory. In another embodiment, a glove 780 or other accessory or clothing may be worn on each hand and each corresponding control mechanism may control a different subset of motors in the motorized surfboard.

Figure 10:
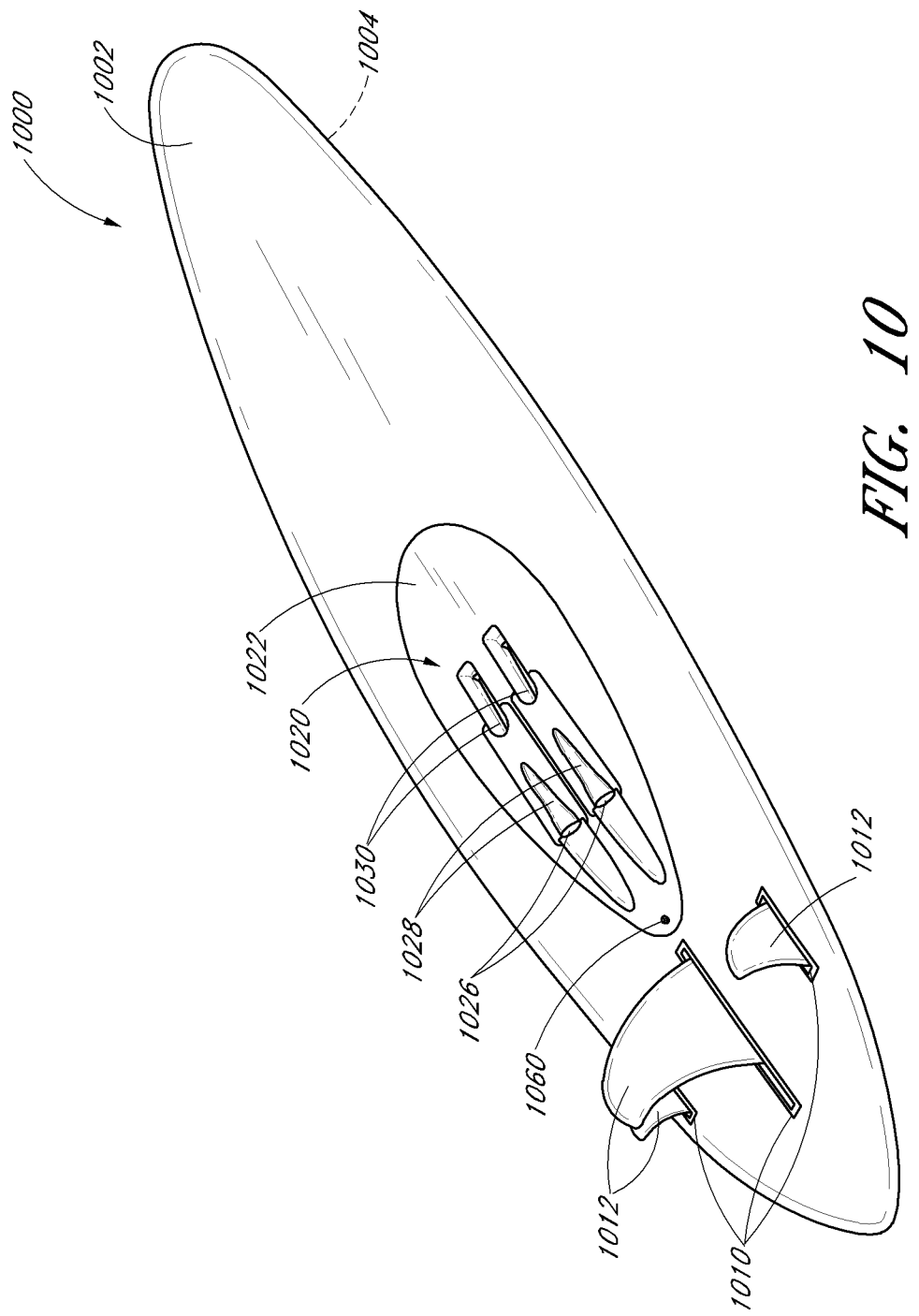
FIG. 10 is a perspective view of a personal watercraft including a first embodiment of a motorized cassette received in a bottom recess of the personal watercraft.
Figure 11:
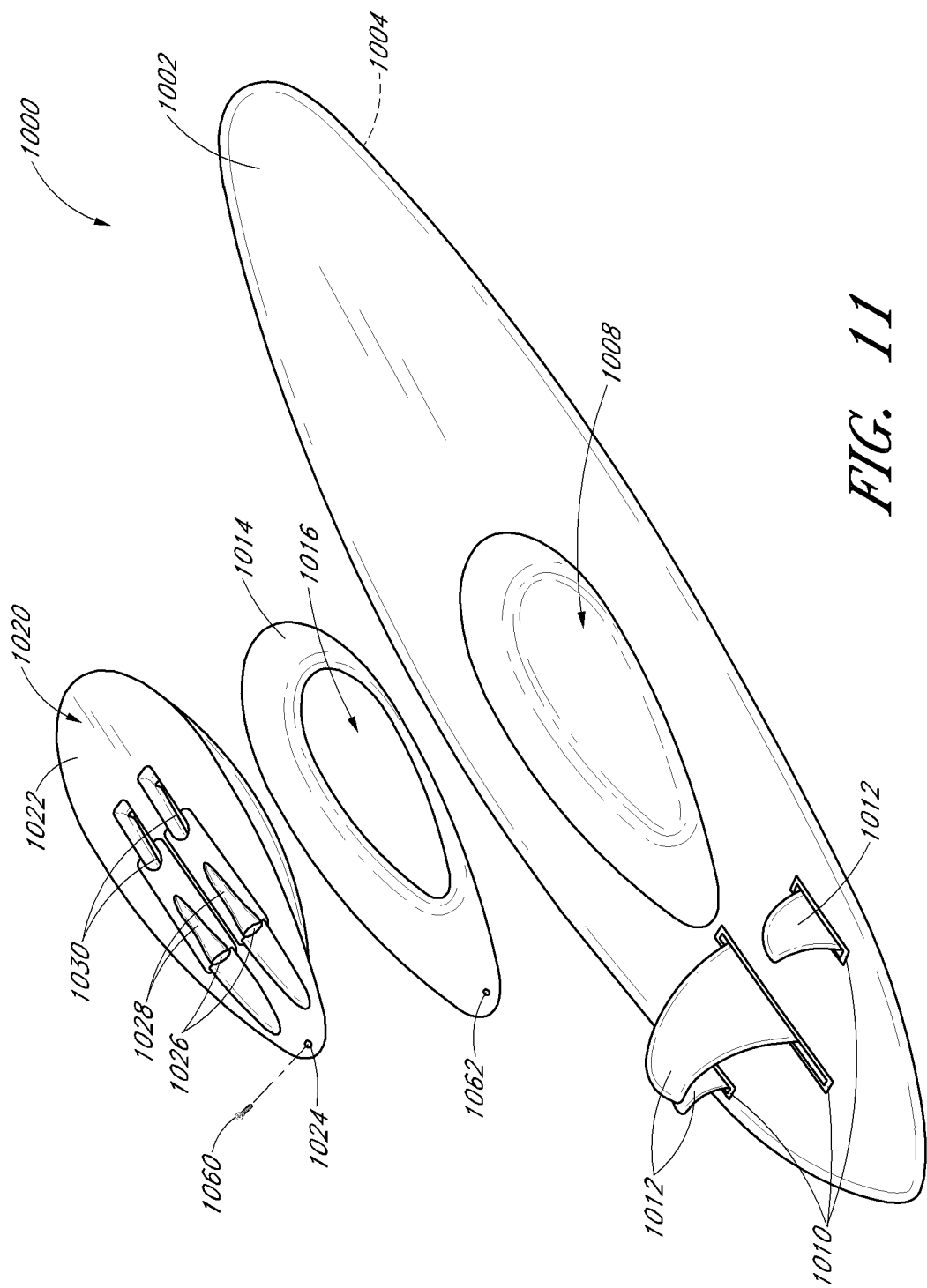
FIG. 11 is an exploded view of the surfboard of FIG. 10.

Turning now to FIGS. 10 and 11, a personal watercraft comprising a first embodiment of a motorized cassette 1020 and a watercraft body 1000 is shown. The body 1000 comprises a top side 1004 and a bottom side 1002. In some embodiments, the body 1000 may comprise a surfboard and in other embodiments the body 1000 may comprise other traditionally non-powered watercrafts including, for example, inflatable watercrafts, dinghies, life rafts, tenders, sail boards, stand up paddle boards ("SUP boards"), kayaks, and canoes. The body 1000 may be constructed by affixing a top shell to a bottom shell as discussed above or may be constructed using other various methods known to those having ordinary skill in the art. The body 1000 may optionally comprise one or more fin boxes 1010 configured to receive one or more fins 1012.

Turning now also to FIG. 11, the bottom side 1002 of the body 1000 may comprise a recess 1008 configured to receive a cassette 1020 therein. The recess 1008 may extend from the bottom surface 1002 toward the top surface 1004 and comprise a generally convex shaped depression in the bottom surface 1002 of the body 1000. In one embodiment, the recess 1008 forms a tear-drop shaped aperture in the bottom surface 1002. The tear-drop shaped aperture may be complimentary to the shapes of an insert 1014 and/or cassette 1020 such that the insert 1014 and/or cassette 1020 can be oriented and/or positioned in a desired configuration within the recess 1008. As explained in further detail below, the insert can be useful because it can include desired features such as flanges, threaded holes for fastener engagement, and the like that can be used to, among other things, secure the cassette in the recess of the surfboard. This allows the shell of the surfboard itself to be entirely made with smooth and gently rounded surfaces in and around the recess 1008 and without sharp corners, holes, or other features that require difficult manufacturing processes. This makes the production of the surfboard 1000 itself very easy and requires minimal changes to the process of manufacturing a conventional surfboard.

With continued reference to FIG. 11, the insert 1014 may comprise a solid or substantially ring-shaped sheet structure configured to cover at least a portion of the recess 1008. The insert 1014 may be coupled to the recess 1008 using various coupling means, for example, adhesives, bonding agents, and/or fasteners. In some embodiments, by virtue of the complimentary shapes of the insert 1014 and the recess 1008, the insert 1014 may be form fitted within the recess 1008 such that the engagement therebetween inhibits longitudinal, lateral, and/or transverse motion of the insert 1014 relative to the recess 1008. When disposed within the recess 1008, the insert 1014 can define a receiving space 1016 for receiving the cassette 1020. In some embodiments, the insert 1014 may comprise one or more relatively small flanges or protrusions (not shown) extending into the receiving space 1016. The one or more flanges can be configured to engage one or more mating grooves (not shown) disposed in the cassette 1020. In one embodiment, a flange extends from a forward most portion of the insert 1014 into the receiving space 1016 and the forward most portion of the cassette 1020 includes a corresponding groove. In this way, the cassette 1020 may releasably engage the insert 1014 to align and hold the front of the cassette 1020 relative to the insert 1014 and body 1000. As shown in FIG. 10, the base surface 1022 of the cassette 1020 may be configured to substantially match the adjacent base surface 1002 of the body 1000 to achieve a desired hydrodynamic profile of the personal watercraft.

The cassette 1020 may be releasably coupled to the insert 1014 and recess 1008 by one or more fasteners 1060. In one embodiment, the insert 1014 includes an internally threaded bore 1062 configured to threadably engage a portion of a threaded fastener 1060, for example, a screw, that passes through a corresponding aperture 1024 formed in the cassette 1020. In another embodiment, a threaded bore is disposed in the body 1000 and configured to engage a portion of threaded fastener 1060. In one embodiment, a groove on a first end of the cassette 1020 may releasably receive at least a portion of a corresponding flange extending from the insert 1014 and the second end of the cassette 1020 may be fastened to the insert/body by fastener 1060 to restrict longitudinal, lateral, and/or transverse motion of the cassette 1020 relative to the recess 1008. As discussed in more detail below, the receiving space 1016 may be configured to releasably receive various different cassettes that are similarly shaped to cassette 1020.

As shown in FIGS. 10 and 11, the removable cassette 1020 may comprise a drive system for the personal watercraft. In one embodiment, the drive system components disclosed with reference to FIGS. 1-6 may be housed within the cassette 1020. For example, cassette 1020 may comprise one or more exhaust ports 1026, one or more pump housings 1028, one or more motor shafts 1030, one or more motors (not shown), one or more batteries (not shown), and/or one or more impellers (not shown). The orientation and design of these components may be basically the same as described above but housed within cassette 1020. Thus, cassette 1020 may propel the body 1000 relative to a body of water, for example, to aid in paddling out a surfboard and catching waves.

Figure 12:
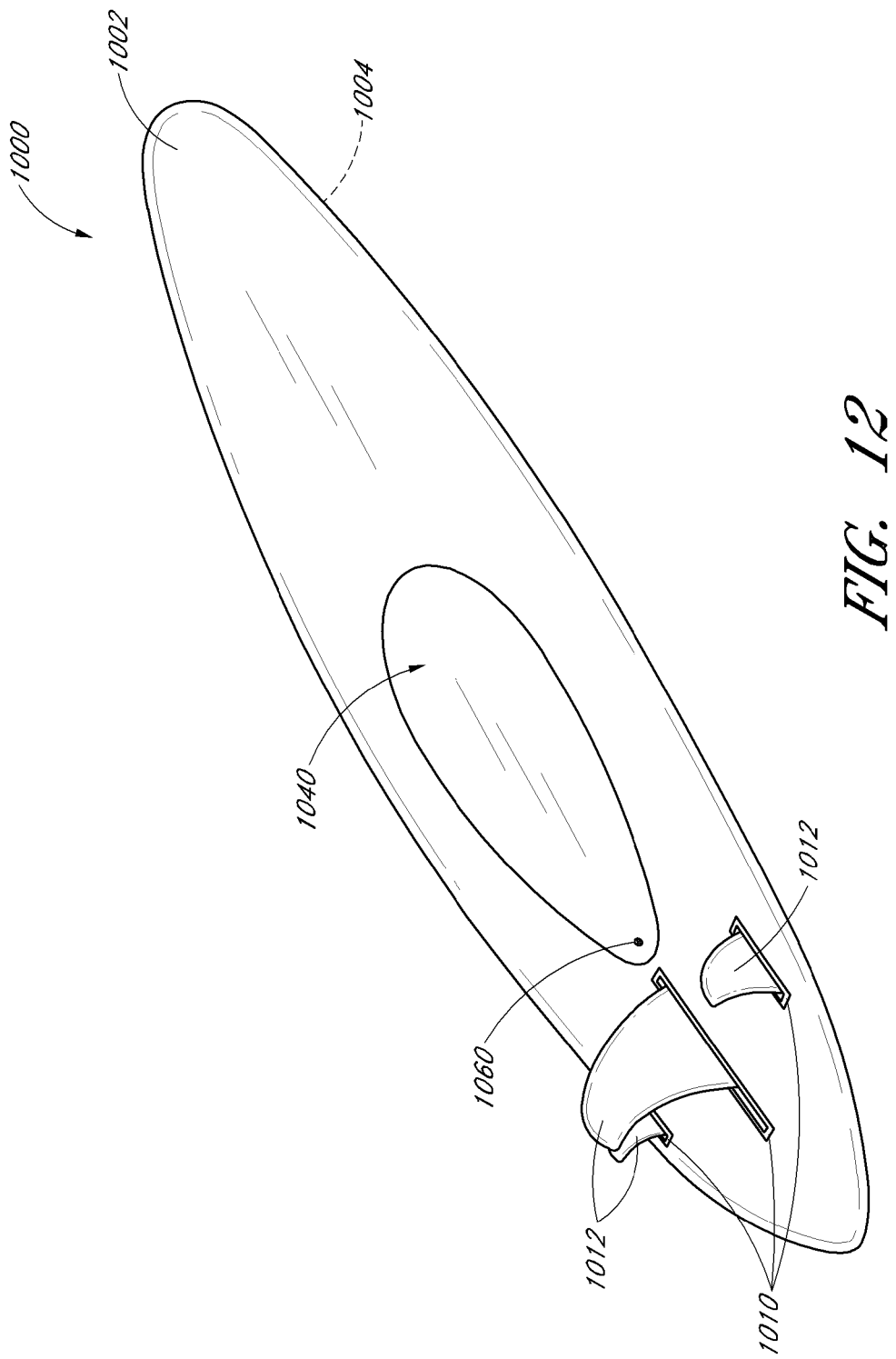
FIG. 12 is a perspective view of the personal watercraft of FIGS. 10 and 11 including a non-motorized cassette received in a bottom recess of the personal watercraft.
Figure 13:
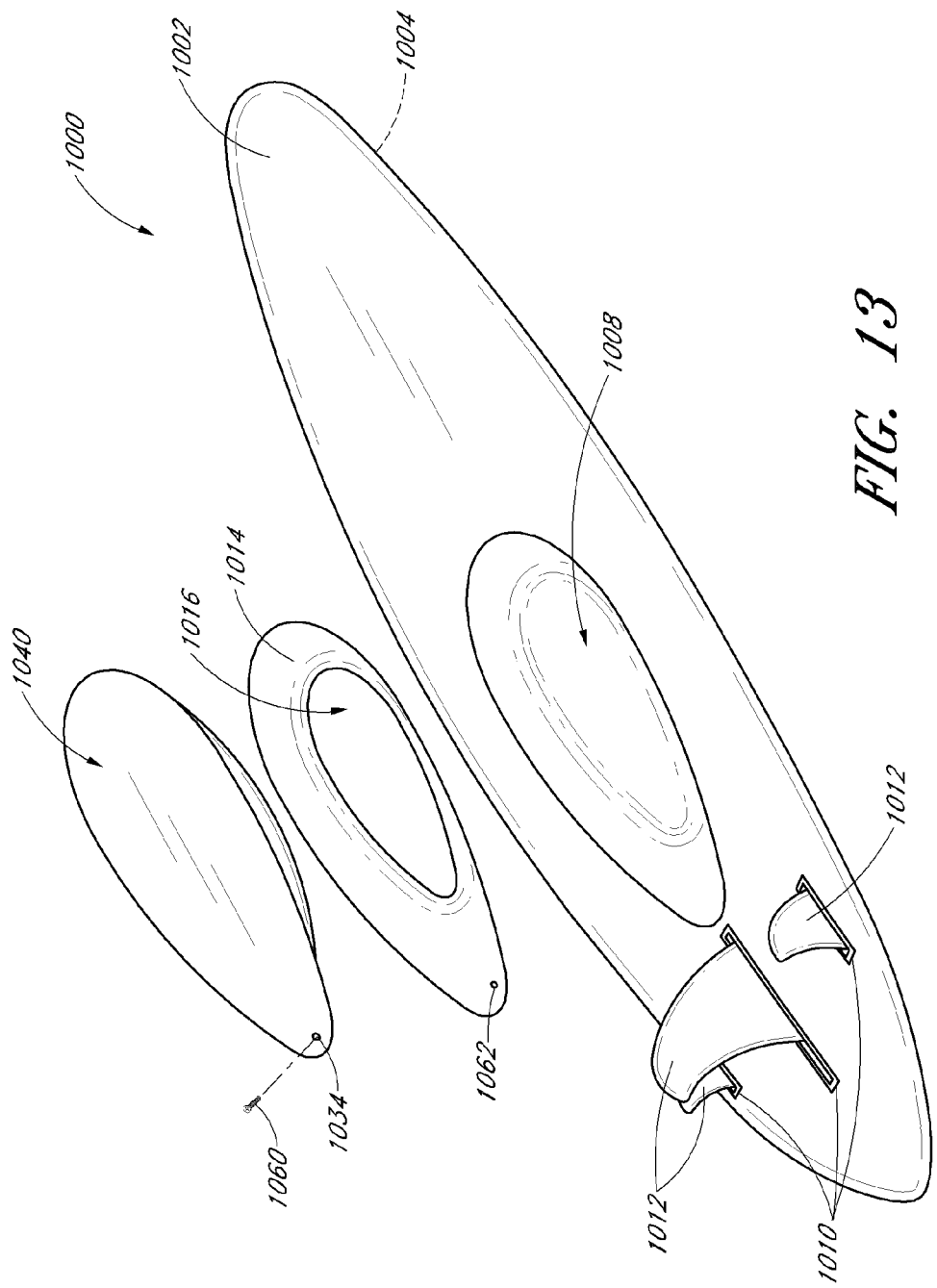
FIG. 13 is an exploded view of the surfboard of FIG. 12.

FIGS. 12 and 13 show the personal watercraft comprising a second embodiment of a cassette 1040 received within body 1000. Cassette 1040 may be similarly shaped to cassette 1020 of FIGS. 10 and 11 such that both cassettes fit tightly within the receiving space 1016 formed by insert 1014. Cassette 1040 may be releasably coupled to the body 1000 by one or more threaded fasteners 1060 and/or the engagement between a flange extending from the insert and a groove in the cassette 1040. As shown, fastener 1060 may pass through an aperture 1034 in the cassette 1040 and be received within threaded bore 1062 in insert 1014.

In contrast to cassette 1020 of FIGS. 10 and 11, cassette 1040 may be un-powered or non-motorized. In some embodiments, the cassette 1040 may be hollow and may enclose a storage space configured to store personal items, for example, sun screen, watercraft hardware, keys, mobile phones, etc. In one embodiment, the storage space may be substantially water tight to protect items stored therein from the ingress of water from a body of water, for example, the ocean. In other embodiments, the cassette 1040 may be substantially solid such that the watercraft has generally uniform buoyancy and/or rigidity characteristics from the front end to the back end.

The cassette 1020 of FIGS. 10 and 11 and the cassette 1040 of FIGS. 12 and 13 may be interchanged to convert the body 1000 between a motorized configuration (FIGS. 10 and 11) and a non-motorized configuration (FIGS. 12 and 13). The body 1000 may come as a kit with one or both of the motorized cassette 1020 and the non-motorized cassette 1040. A user may switch between cassettes 1020 and 1040 depending on water conditions and/or desired performance characteristics of the personal watercraft. For example, a user may wish to lower the overall mass characteristic of the personal watercraft by opting to place the non-motorized cassette 1040 within the body 1000 or a user may wish to minimize human energy used in a surf session by opting to place the motorized cassette 1020 within the body 1000.

Figure 14:
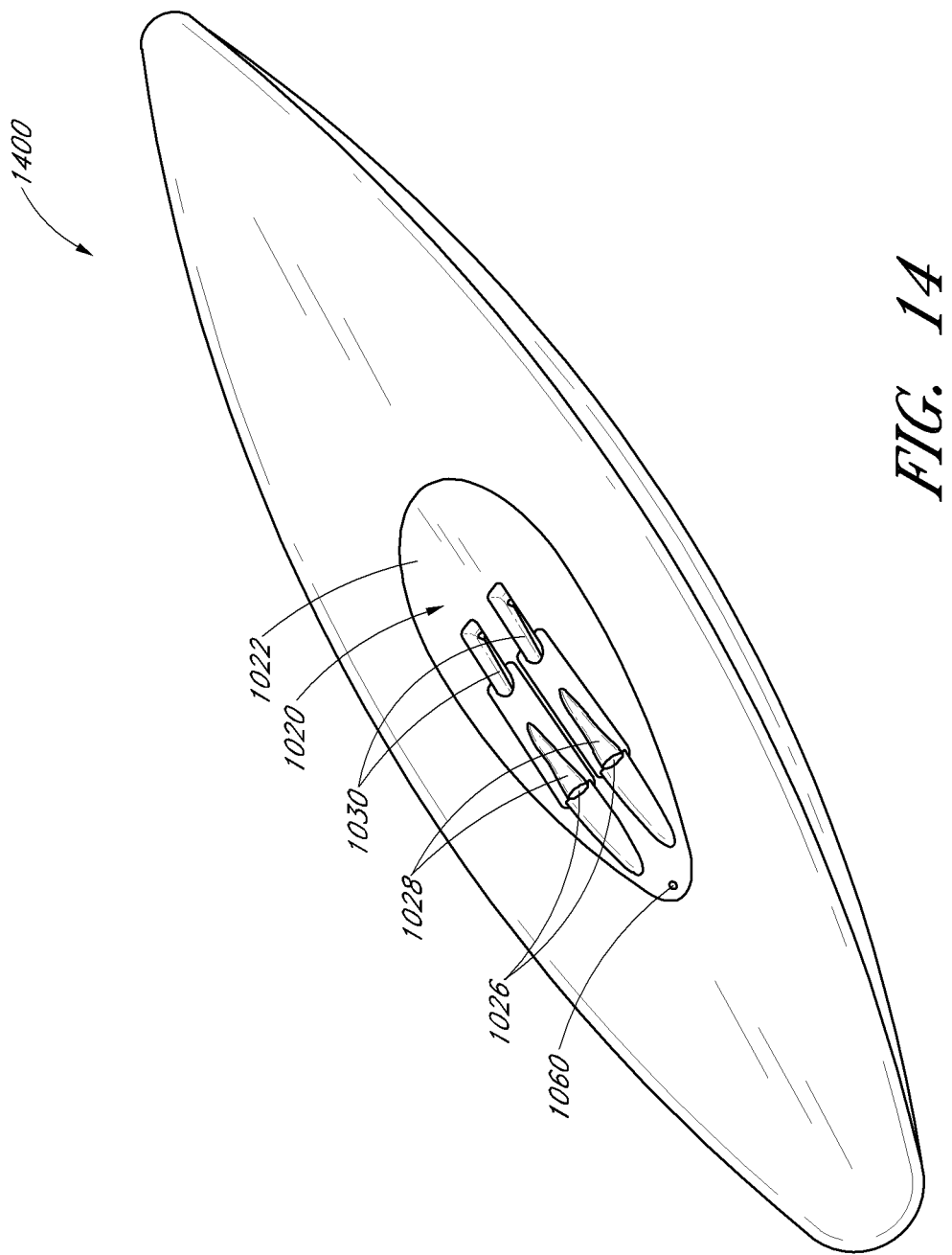
FIG. 14 is a perspective view of a kayak including the first embodiment of a cassette received in a bottom recess of the kayak.
Figure 15:
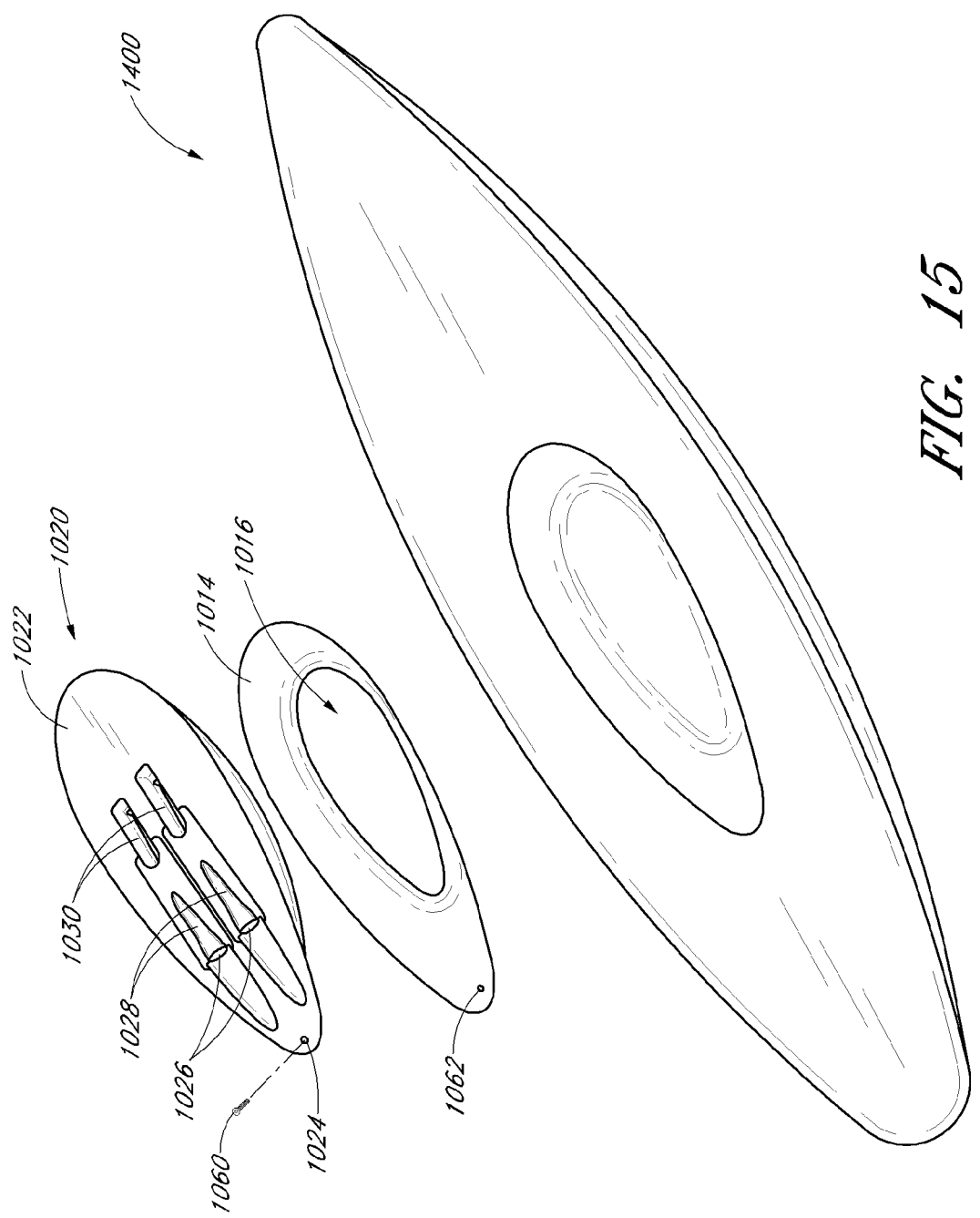
FIG. 15 is an exploded view of the kayak of FIG. 14.

FIGS. 14 and 15 show a kayak including the cassette 1020 and insert 1014 of FIGS. 10 and 11 received within a recess 1408 of the kayak body 1400. As shown, a single cassette (e.g., cassette 1020 of FIGS. 10 and 11 or cassette 1040 of FIGS. 12 and 13) may be placed in different watercraft bodies that have recesses configured to receive the cassette. For example, a motorized cassette 1020 can be configured to fit within a recess in the body of a surfboard and a similarly shaped recess in the body of a kayak such that a user may use the same motorized cassette in multiple watercrafts. In this way, a user may purchase a single motorized cassette to propel different watercrafts. Further, in some implementations, a motorized cassette may be used as a stand alone device to propel a user without a watercraft. For example, a user may hold a motorized cassette 1020 and be propelled through a body of water without a more substantial watercraft (e.g., without a surf board or kayak).

Figure 16:
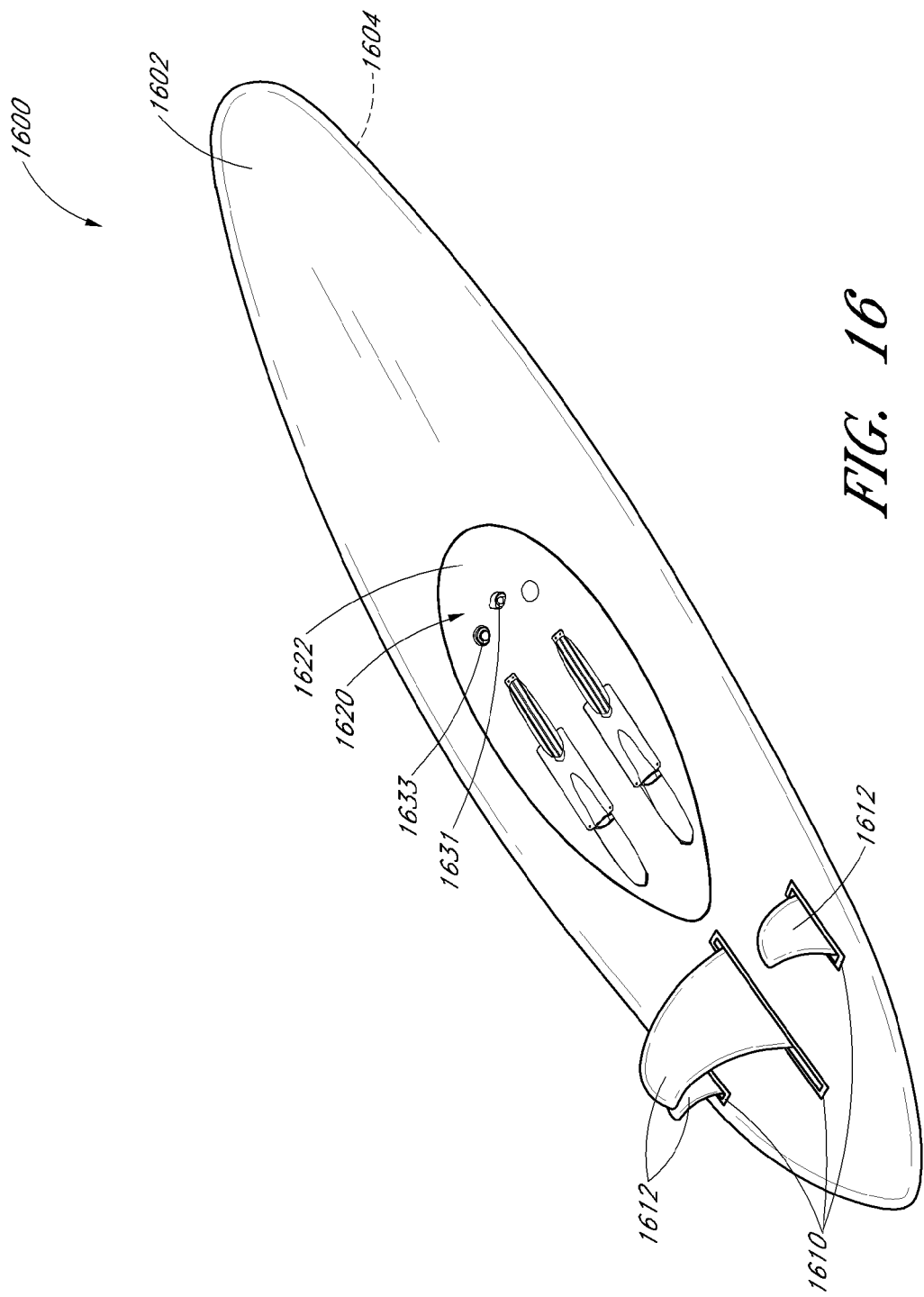
FIG. 16 is a perspective view of a personal watercraft including a second embodiment of a motorized cassette received in a bottom recess of the personal watercraft.
Figure 17:
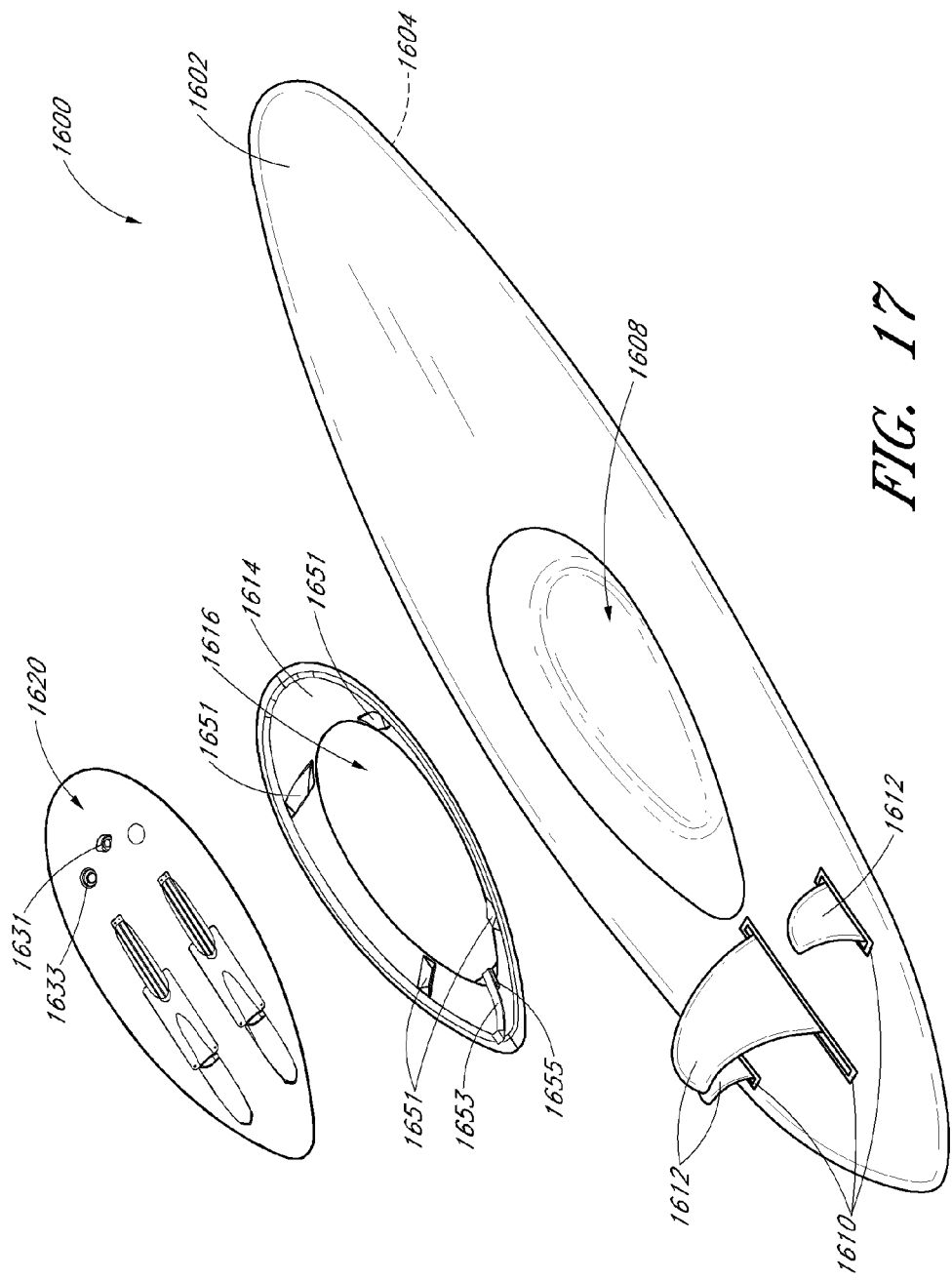
FIG. 17 is an exploded view of the surfboard of FIG. 16.

Turning now to FIGS. 16 and 17, a personal watercraft comprising a motorized cassette 1620 and a watercraft body 1600 is shown. The body 1600 comprises a top side 1604 and a bottom side 1602. In some embodiments, the body 1600 may comprise a surfboard and in other embodiments the body 1600 may comprise other various watercrafts. Similar to the personal watercraft of FIGS. 10-13, the body 1600 may be constructed by affixing a top shell to a bottom shell as discussed above or may be constructed using other various methods known to those having ordinary skill in the art. The body 1600 may optionally comprise one or more fin boxes 1610 configured to receive one or more fins 1612.

Turning now to FIG. 17, the bottom side 1602 of the body 1600 may comprise a recess 1608 configured to receive a cassette 1620 therein. The recess 1608 may extend from the bottom surface 1602 toward the top surface 1604 and comprise a generally convex shaped depression in the bottom surface 1602 of the body 1600. In one embodiment, the recess 1608 forms a tear-drop shaped aperture in the bottom surface 1602. The tear-drop shaped aperture may be complimentary to the shapes of the insert 1614 and/or cassette 1620 such that the insert 1614 and/or cassette 1620 can be oriented and/or positioned in a desired configuration within the recess 1608.

With continued reference to FIG. 17, the insert 1614 may comprise a solid or substantially ring-shaped sheet structure configured to cover at least a portion of the recess 1608. The insert 1614 may be coupled to the recess 1608 using various coupling means, for example, adhesives, bonding agents, and/or fasteners. In some embodiments, by virtue of the complimentary shapes of the insert 1614 and the recess 1608, the insert 1614 may be form fitted within the recess 1608 such that the engagement therebetween inhibits longitudinal, lateral, and/or transverse motion of the insert 1614 relative to the recess 1608. When disposed within the recess 1608, the insert 1614 can define a receiving space 1616 for receiving the cassette 1620.

In some embodiments, the insert 1614 may include one or more protrusions 1651 configured to be inserted into one or more indentations 1659 (shown in FIG. 18) on the cassette 1620. The protrusions 1651 and indentations 1659 on the cassette 1620 can have complimentary shapes such that the protrusions may be received by the indentations by sliding the cassette 1620 forward longitudinally relative to the insert 1614. The engagement of the protrusions 1651 and corresponding indentations can result in one or more abutments that act to arrest or inhibit longitudinal, lateral, and/or transverse movement of the cassette 1620 relative to the insert 1614 and body 1600.

The insert 1614 may also include a latch element 1653 that is cantilevered from a latch plate 1655. The latch element 1653 may catch one or more surfaces within a receptacle 1661 (shown in FIG. 18) on the cassette 1620 when the cassette 1620 is received within the insert 1614 to secure the cassette 1620 in the longitudinal direction relative to the insert 1614. In this way, the cassette 1620 may be slid forward into the insert 1614 until the latch 1653 releasably engages a notch or other feature on the cassette such that the cassette 1620 is aligned and secured relative to the insert 1614. To remove the cassette 1620 from the insert 1614, the latch element 1653 may be depressed by applying a force to the cantilevered end of the latch element 1653 to disengage the latch element from the notch or other feature of the cassette. Disengaging the latch element 1653 then will allow a user to slide the cassette 1620 backward longitudinally relative to the insert 1614 to release the protrusions 1651 from the indentations 1659 and to remove the cassette 1620 from the body 1600.

As shown in FIG. 16, the base surface 1622 of the cassette 1620 may be configured to substantially match the adjacent base surface 1602 of the body 1600 to achieve a desired hydrodynamic profile of the personal watercraft. The base surface 1622 may also include a charging port 1631 and/or activation switch 1633. Thus, the cassette 1620 may be charged when the cassette is coupled to the watercraft body 1600 or when it is separate from the watercraft body. In embodiments when these are provided, the charger port 1631 can be disposed on an opposite side of the cassette 1620 and the activation switch 1633 can be disposed elsewhere as well if desired.

Figure 18:
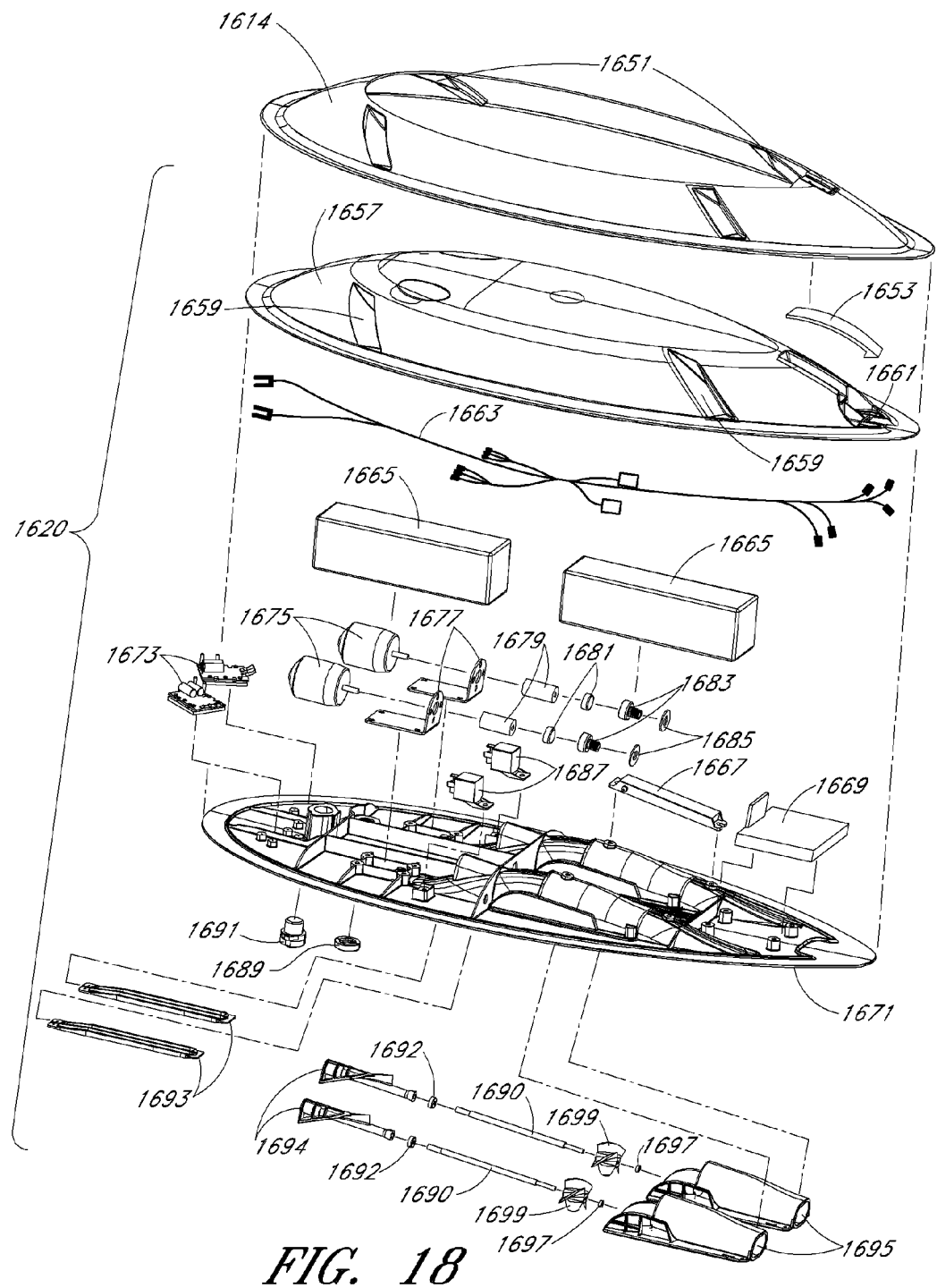
FIG. 18 is an exploded view of the motorized cassette of FIGS. 16 and 17.
Figure 19:
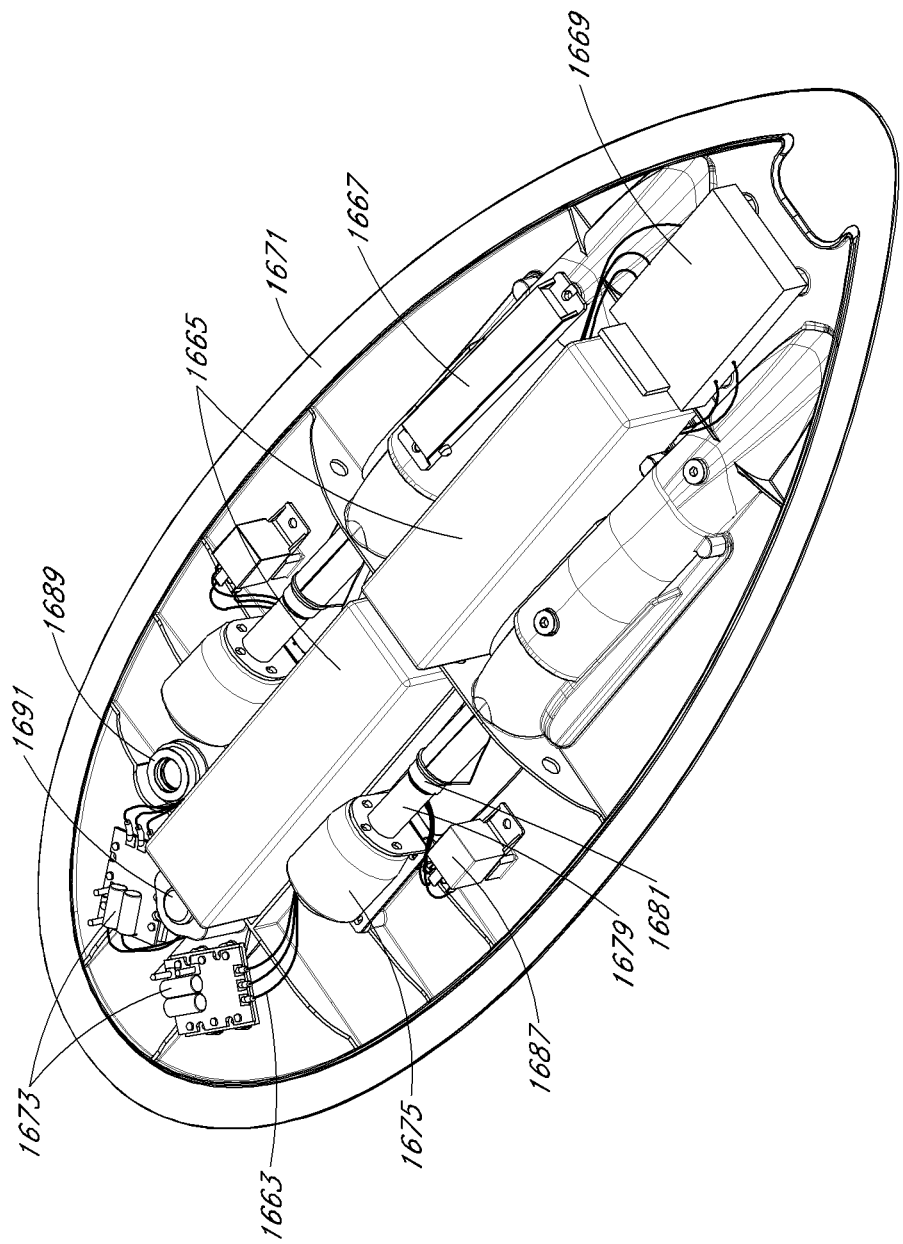
FIG. 19 is a perspective cutaway view of the motorized cassette of FIG. 18.

As shown in FIGS. 18 and 19, the removable cassette 1620 may comprise a drive system including one or more motors 1675. In one embodiment, the drive system can be at least partially housed between a cassette base 1671 and a cassette cover 1657. The cassette base 1671 and the cassette cover 1657 can be attached to each other to form an outer housing, within which an inner volume can enclose one or more of the drive system components of cassette 1620, such as electronic components. In some embodiments, the base 1671 and cover 1657 can be attached to each other along a sealed perimeter formed by these components, as described further below.

The one or more motors 1675 can be powered by one or more batteries 1665 and can be mounted to the cassette base 1671 by motor mounts 1677. In some embodiments, each motor 1675 can be coupled to a motor shaft 1690 by a shaft coupler 1679, shaft bearing 1681, bearing holder 1683, and spacer 1685. Each shaft 1690 can be coupled to an impeller 1699 that is disposed at least partially within a pump housing 1695 and a bearing 1697 can optionally be disposed between each shaft and the impeller 1699. In this way, the one or more motors 1675 can drive each impeller 1699 to draw water through the pump housing 1695 to propel the cassette relative to a body of water.

In some embodiments, each shaft 1690 can be disposed within a shaft housing 1694 that is configured to limit the exposure of the shaft 1690 to objects that are separate from the cassette 1620. Thus, the shaft housing 1694 can protect a user from inadvertently contacting the shaft 1690 during use and/or can protect the shaft 1690 from contacting other objects, for example, sea grass. Additionally, the shaft housing 1694 can improve performance of the cassette 1620 by isolating each shaft 1690 from the water that passes through the pump housing 1695. In some embodiments, each shaft 1690 can be protected from exposure to the water by one or more shaft seals 1692.

The cassette 1620 can also include one or more grates 1693 disposed over intake ports of the pump housing 1695. The grates 1693 can limit access to the impeller 1699 and shaft 1690 to protect these components and/or to prevent a user from inadvertently contacting these components during use. In some embodiments, each pump housing 1695 and/or grate 1693 can be coupled to one or more magnetic switches (not shown) that can deactivate the motors 1675 when the pump housing 1695 and/or grate 1693 are separated from the cassette base 1671. Therefore, the one or more magnetic switches may prevent the cassette from operating without the optional grate 1693 and/or pump housing in place.

With continued reference to FIGS. 18 and 19, the drive system may also include one or more motor controllers 1673 for each motor 1675, one or more relays 1687 configured to connect the one or more batteries 1665 with the one or more motor controllers 1673, an antenna 1667, and a transceiver 1669. The one or more motor controllers 1673, one or more relays 1687, one or more batteries 1665, antenna 1667, and transceiver 1669, can be electrically connected to each another by one or more wiring harnesses 1663. As discussed above, the transceiver 1669 can include or be coupled to wireless transmission circuitry that is configured to transmit electromagnetic and/or magnetic signals underwater.

Cassette 1620 can include various features to seal and/or protect one or more of its components from an external environment, such as liquid or moisture. In some embodiments, one or more leak detection sensors can be employed to detect moisture or liquid proximate to one or more components of the drive system (e.g., within the inner volume formed by the cassette base 1671 and cover 1657). Such leak sensors can provide a signal to or within the control system of the cassette 1620, to providing a leak warning and/or to power-off one or more electrical components within cassette 1620. For example, one or more leak detection sensors may be employed proximate to the batteries, to turn off power if liquid is detected, so there are no hot leads proximate to the waterproof battery cases.

In some embodiments, one or more components of cassette 1620 can be attached with respect to each other to form a seal and protect from an external environment. For example, adhesive and welding/bonding (spin, ultrasonic, vibratory, chemical, thermal, etc.), and other known attachment techniques can be employed to attach and seal one or more components of cassette 1620. For example, vibratory welding can be employed, in which two components (e.g., thermoplastic components) are held together with a force and vibrated quickly to melt and thus weld these components to each other.

In a preferred embodiment, a vibratory welding process is employed to melt a portion (e.g. perimeter) of the cassette base 1671 and the cassette cover 1657 to each other, and form a vibratory weld. This weld can seal these components to each other and protect them from external conditions. Other components of cassette 1620 can be similarly attached. For example, the activation switch 1631 and/or charger 1633, or housings configured to hold these components, can be spin welded to another portion of cassette 1620, such as the base 1671. Spin welding is a known type of frictional welding in which two components (e.g., thermoplastic components) are held against and rotated relative to each other, to melt and form a seal between these components. Vibratory and spin welding has been found to improve manufacturability and reliability of the cassette.

Figure 20:
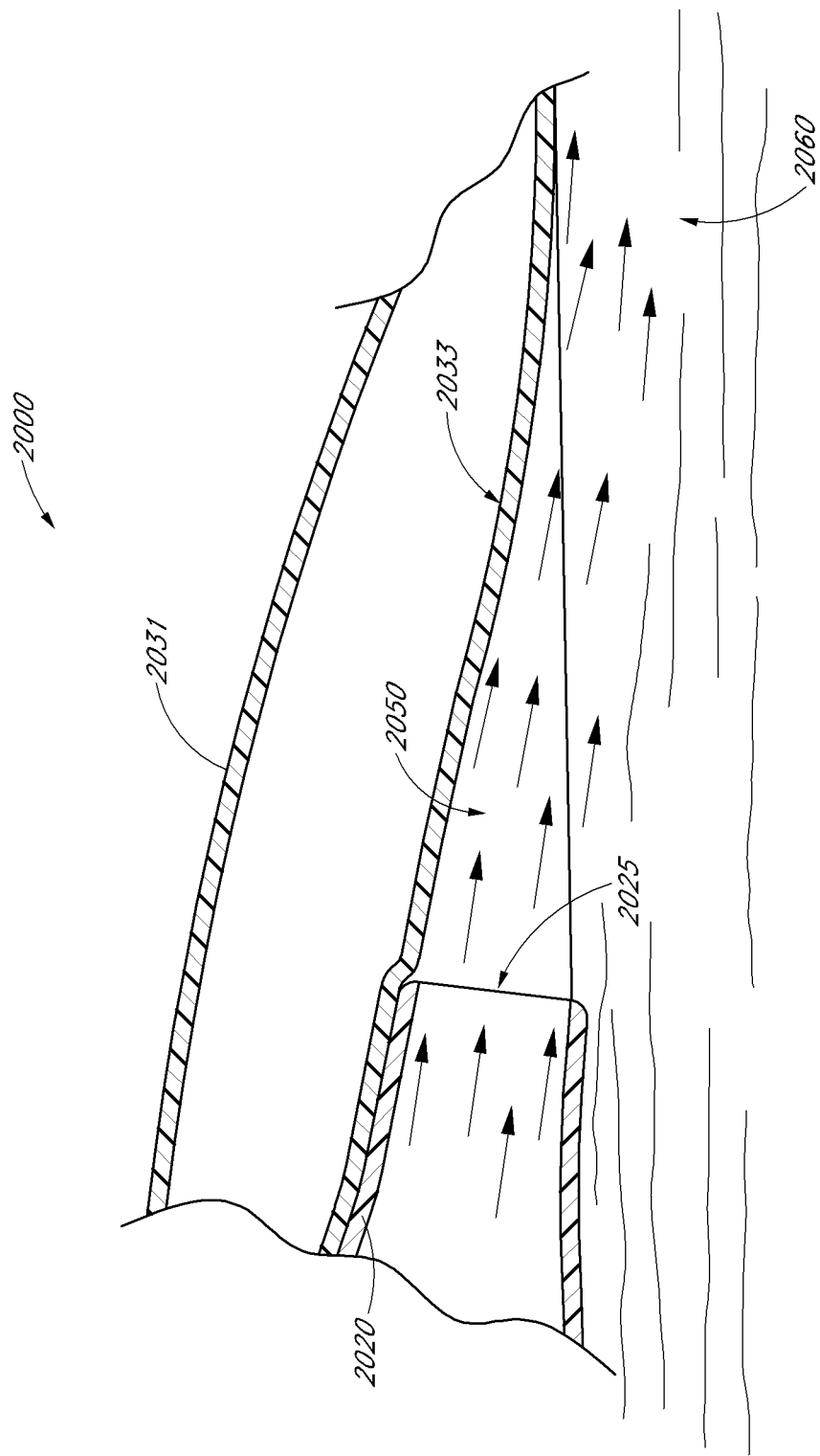
FIG. 20 is a cross-sectional view of a personal watercraft including a curved body section adjacent to the exhaust port of the pump housing.
Figure 21:
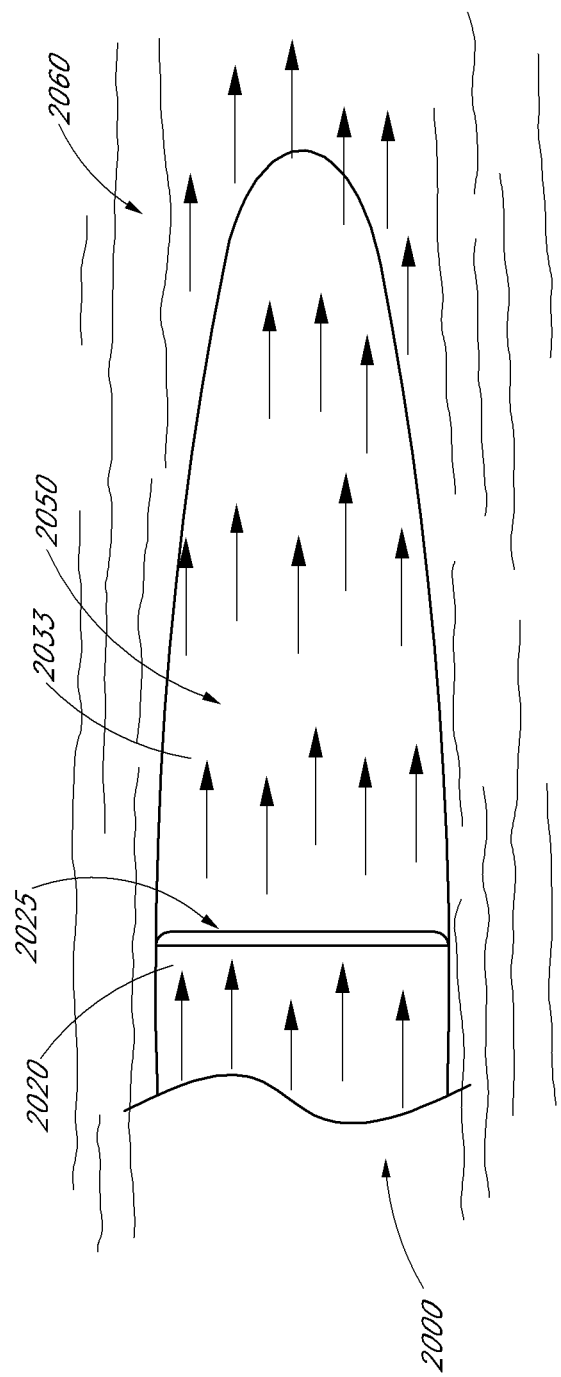
FIG. 21 is a bottom view of the personal watercraft of FIG. 20.

FIGS. 20 and 21 show a personal watercraft 2000 comprising a body 2031 having a curved section 2033 disposed adjacent to and rearward of a pump housing 2020 and pump housing exhaust port 2025. The curved section 2033 may be shaped to create a Coanda Effect to direct flow from the exhaust port 2025 to follow the curve of the curved section 2033. The Coanda Effect on the flow that exits the exhaust port 2025 can result in an effective thrust of the expelled fluid in a thrust area 2050 as the expelled fluid enters the surrounding water 2060. As used herein, the term "Coanda Effect" refers to the tendency of a fluid jet to be attracted to a nearby surface, for example, the curved section 2033 of personal watercraft 2000 body 2031. The curved section 2033 and the relative positioning of the curved section 2033 and the pump housing 2020 can be incorporated in any of the personal watercraft described herein to create a thrust area between the exhaust port 2025 and the curved section 2033.

Figure 22:
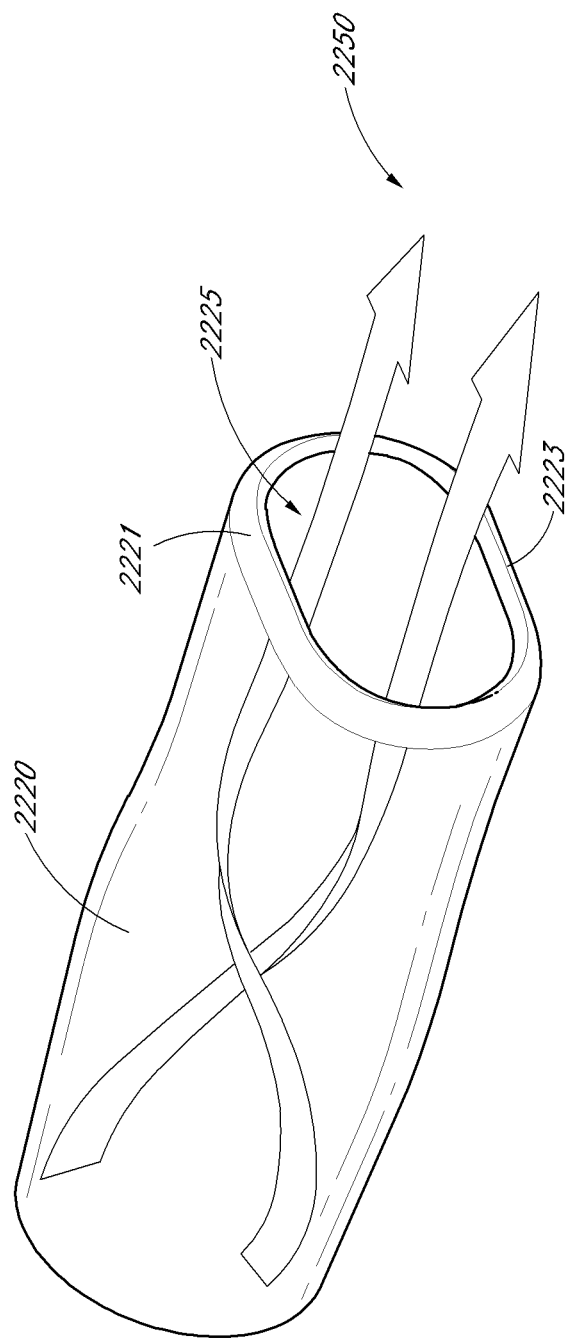
FIG. 22 is a perspective view of a pump housing including a flattened exhaust port.

FIG. 22 shows an embodiment of a pump housing 2220 having a generally curvilinear cross-sectional shape that tapers to a flattened and oblong exhaust port 2225. The exhaust port 2225 includes a first flattened side 2221 and a second flattened side 2223 disposed opposite to the first side. The first and second sides 2221, 2223 of exhaust port 2225 stabilize the rotational flow of water passing therethrough to create a more uniform flow of expelled water in the thrust area 2250 adjacent to and rearward of the exhaust port 2225. Pump housing 2220 can optionally include one or more flow straighteners, for example, flow straighteners 228 previously discussed with reference to FIGS. 2 and 3. The optional flow straighteners can be configured to stabilize the flow of water passing through the pump housing 2220 and the exhaust port 2225 can be configured to further stabilize the flow of water passing therethrough. The shape of the pump housing 2220 and the exhaust port 2225 can be incorporated in any of the personal watercraft described herein to create a more uniform flow in the thrust area adjacent to the exhaust port 2225.

FIGS. 10-17 show embodiments of personal watercrafts that include a receiving space configured to receive a motorized or non-motorized cassette. As discussed now with reference to FIGS. 23-29, in some embodiments, the motorized cassettes disclosed herein can be releasably mounted or otherwise coupled to a watercraft body that does not include a corresponding receiving space. In this way, the motorized cassettes can provide motorized propulsion capability to the watercraft.

Figure 23:
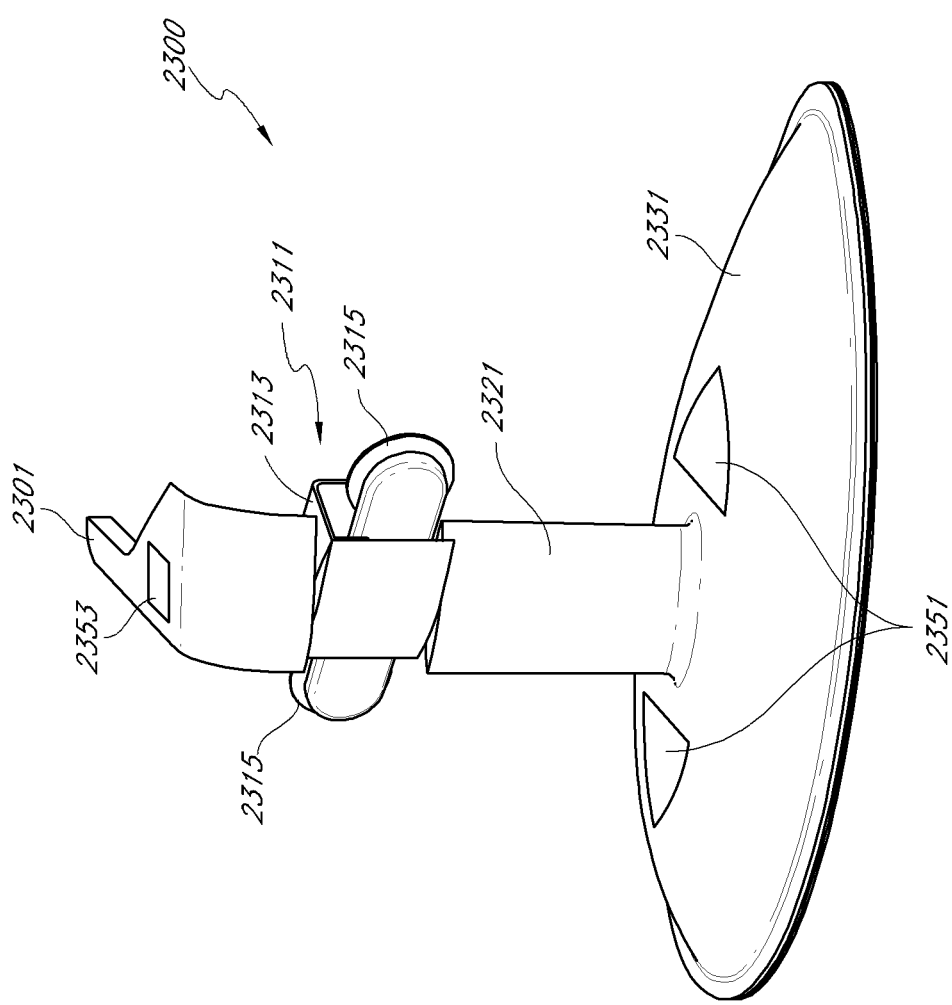
FIG. 23 is a top perspective view of one embodiment of a mounting system for mounting a motorized cassette to a watercraft.

FIG. 23 is a top perspective view of one embodiment of a mounting system 2300 that can be used to secure, mount, or otherwise couple a motorized cassette to a watercraft body. The mounting system 2300 includes a tiller 2301, a mounting assembly 2311, a steering column 2321, and a housing 2331. As discussed in further detail below, the housing 2331 can be configured to releasably accept a motorized cassette in a receiving space formed in the bottom side of the housing. The housing 2331 can also include optional solar panels 2351 to directly charge the batteries of the received motorized cassette when sunlight is available.

The mounting assembly 2311 can include a u-shaped bracket 2313 and one or more mounting disks 2315 that can be adjusted relative to the bracket. The mounting disks 2315 and bracket 2313 can cooperate to frictionally engage a portion of a watercraft, for example, a transom or sidewall of a watercraft hull. In this way, the mounting assembly 2311 can be releasably secured relative to a watercraft body at various locations. As shown, the steering column extends downward from the mounting assembly 2311 such that the housing 2331 is offset from the mounting assembly. The length of the steering column 2321 can be adjusted depending on the dimensions of the intended watercraft such that the housing 2331 lies just below the waterline of the watercraft. Thus, the mounting assembly 2311 can be configured to have a limited fluid profile in a body of water and to allow an associated watercraft to traverse shallow waters with motorized propulsion.

With continued reference to FIG. 23, the tiller 2301, steering column 2321, and housing 2331 can each be coupled to one another and configured to move in concert relative to the mounting assembly 2311. For example, the tiller 2301 can be manipulated to rotate the steering column and housing 2331 relative to the mounting assembly 2311 to steer a watercraft in different directions. In some embodiments, the housing 2331 can include one or more skegs (not shown) disposed near the front and/or rear of the housing to further facilitate steering.

As schematically illustrated, the tiller 2301 can optionally include a control mechanism 2353 for controlling a motorized cassette received within the housing 2331. As discussed above with respect to FIG. 7, the control mechanism 2353 can include a processor, an accelerometer, a memory, and a transmitter. In some embodiments, the control mechanism 2353 can directly communicate with a received cassette via a hard wire connection through the mounting system 2300. In other embodiments, the control mechanism 2353 can communicate wirelessly with a received cassette. Additionally, the control mechanism 2353 can be fixed relative to the tiller 2301 or can be releasably securable to the mounting system 2300. For example, the control mechanism 2353 can be similar to the control mechanism 680 of FIG. 9 and can be releasably secured to the tiller 2301. Alternatively, the mounting system 2300 does not include a control mechanism and a received cassette can be controlled by a separate control mechanism, for example, the control mechanism 680 of FIG. 9 worn as a glove or watch by an operator.

As discussed above, the mounting system 2300 of FIG. 23 can be secured relative to a watercraft to provide motorized propulsion capability thereto. FIGS. 24-29 illustrate an embodiment of a watercraft 2400 showing mounting system 2300 of FIG. 23 and an associated watercraft body 2411.

Figure 24:
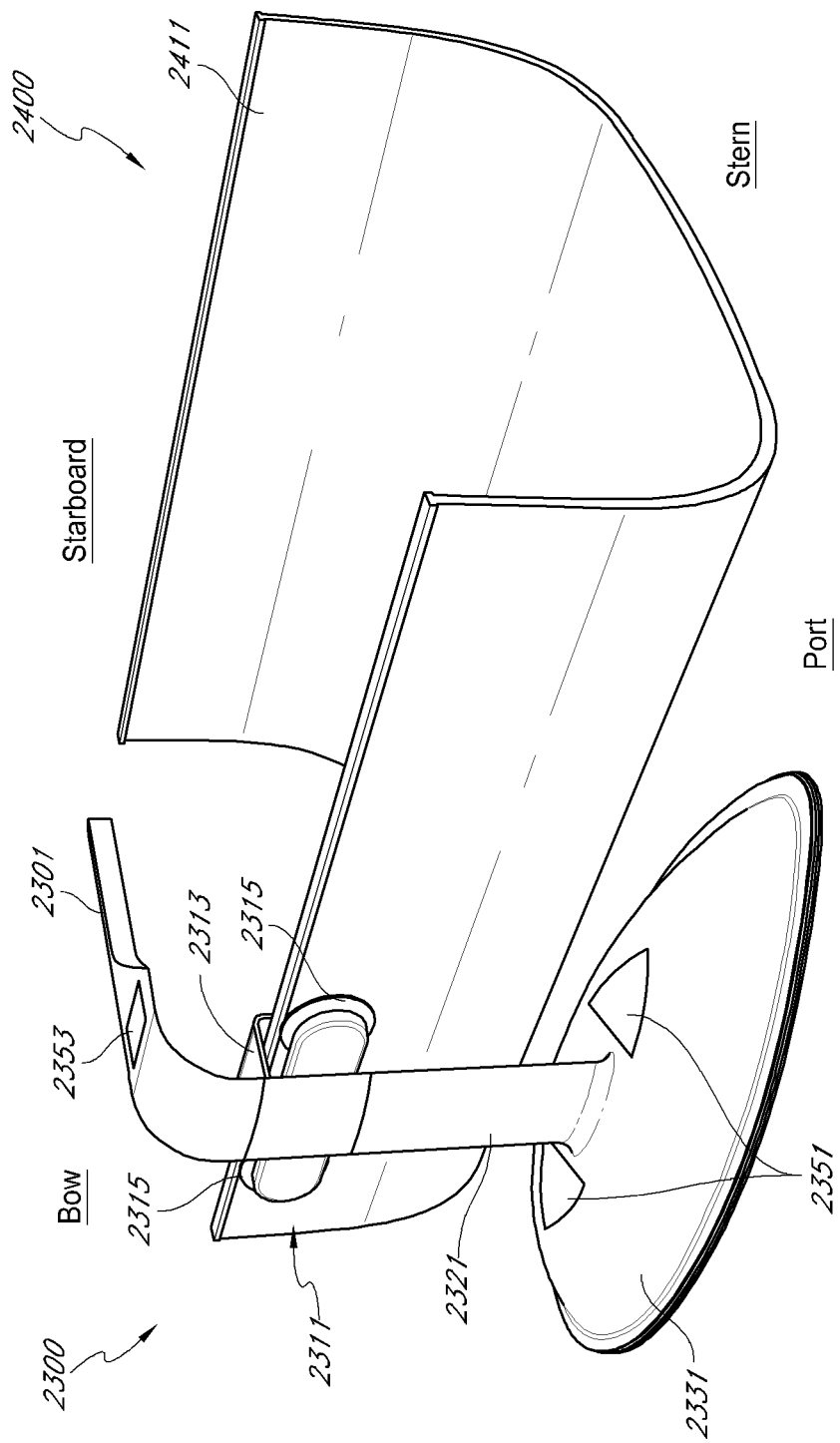
FIG. 24 is a top perspective view of a motorized watercraft including the mounting system of FIG. 23 mounted to a cutaway of a watercraft body.

As shown in FIG. 24, the mounting system 2300 can be mounted via the mounting assembly 2311 to the aft or starboard sidewall of the watercraft body 2411. In some embodiments, the mounting system 2300 can be mounted to a transom along the bow or stern of the watercraft body 2411 to provide front-side or rear-side propulsion, respectively. For illustrative purposes, the watercraft body 2411 of FIGS. 24-29 is depicted as a partial cutaway of a generic watercraft. However, it will be appreciated by one of ordinary skill in the art that the watercraft body 2411 can comprise various watercraft bodies, including, for example, dinghies, rafts, tenders, rowboats, gondolas, skiffs, barges, inflatable watercrafts, motor boats, sail boats, dories, sharpies, punts, jonsboats, and catamarans. Thus, the mounting system 2300 can be utilized to provide motorized propulsion capability to an otherwise non-powered watercraft or can be utilized to provide motorized propulsion capability to an otherwise powered watercraft.

Figure 25:
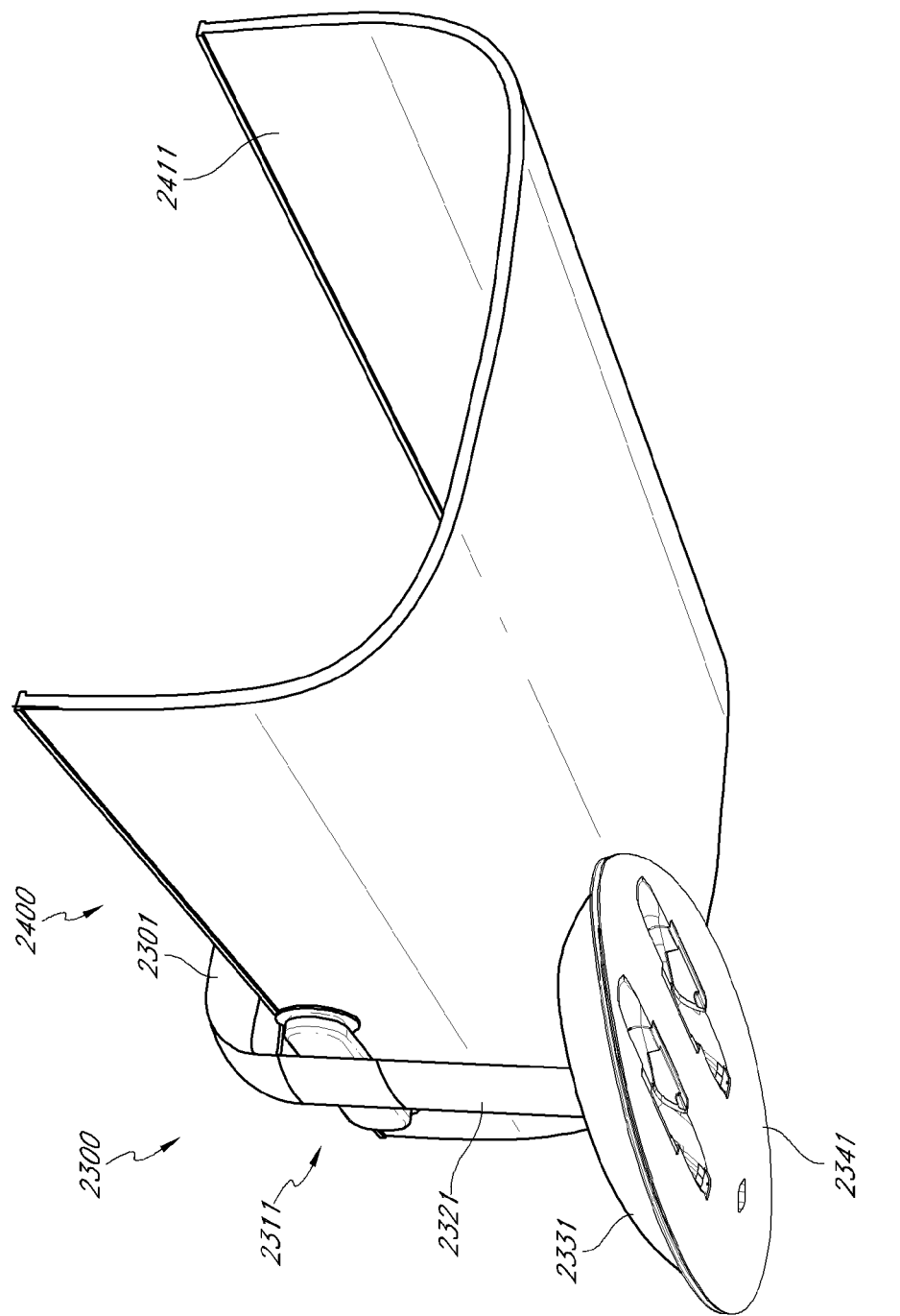
FIG. 25 is a bottom perspective view of the motorized watercraft of FIG. 24.
Figure 26:
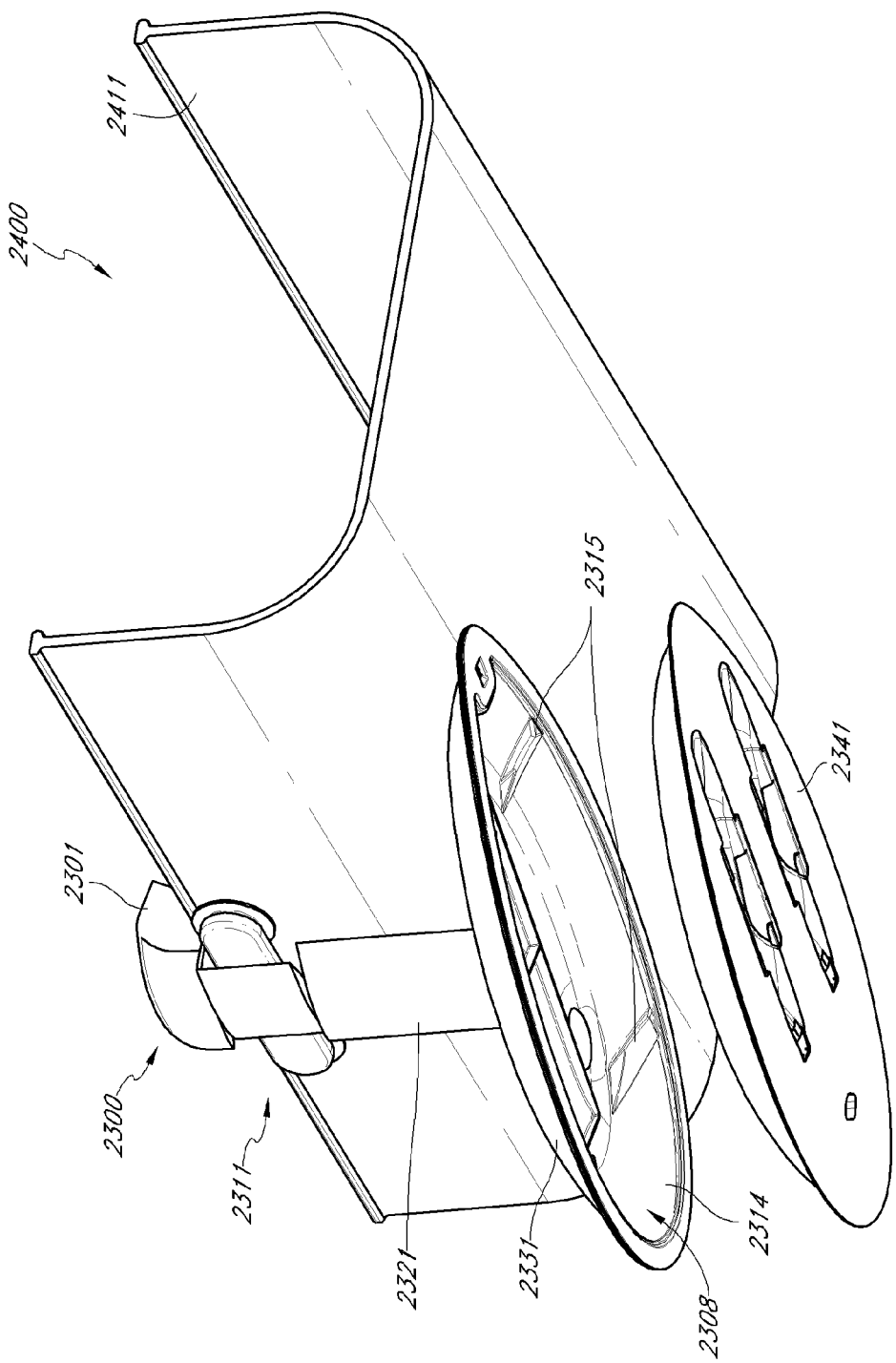
FIG. 26 is a partially exploded bottom perspective view of the motorized watercraft of FIG. 25 showing the motorized cassette separate from a corresponding receiving space.

As shown in FIGS. 25 and 26, an interchangeable motorized cassette 2341 can be inserted at least partially within a receiving space 2308 formed in the bottom side of the housing 2331. The receiving space 2308 is defined by a bottom facing surface 2314 of the housing 2331 which includes protrusions 2315. Similar to the insert 1614 and cassette 1620 of FIGS. 17 and 18, the protrusions 2315 are configured to be inserted into one or more indentations (not shown) on the cassette 2341 to arrest or inhibit longitudinal, lateral, and/or transverse movement of the cassette 2341 relative to the housing 2331.

The bottom facing surface 2314 may also include a latch element configured to releasably engage a notch or other feature on the cassette 2341 such that the cassette 2341 is aligned and secured relative to the housing 2331. In some embodiments, the cassette 2341 may be secured relative to the housing 2331 by other means, for example, one or more mechanical fasteners. In this way, the cassette 2341 may be easily inserted into and removed from the mounting assembly. In some implementations, the housing 2331 may be rotated about the mounting assembly 2311 to remove the housing from the water in order to remove or insert the cassette 2341. In other implementations, the mounting system 2300 and cassette 2341 may have a low enough weight such that the entire mounting system 2300 may be easily separated from the water craft body 2411 to remove or insert the cassette 2341.

In some embodiments, the motorized cassette 2341 may be substantially similar to the motorized cassette 1620 of FIGS. 17 and 18 and the surface 2314 of housing 2331 can also be substantially similar to the insert 1614 of FIGS. 17 and 18. In such embodiments, a single motorized cassette can be provided for use with a personal watercraft having a receiving space and/or for use with mounting system 2300. In other embodiments, the motorized cassette 2341 may be differently sized and/or shaped than the motorized cassette 1620 of FIGS. 17 and 18. For example, motorized cassette 2341 may be larger than the motorized cassette 1620 to house different batteries, motors, impellers, and/or other drive system components.

Figure 27:
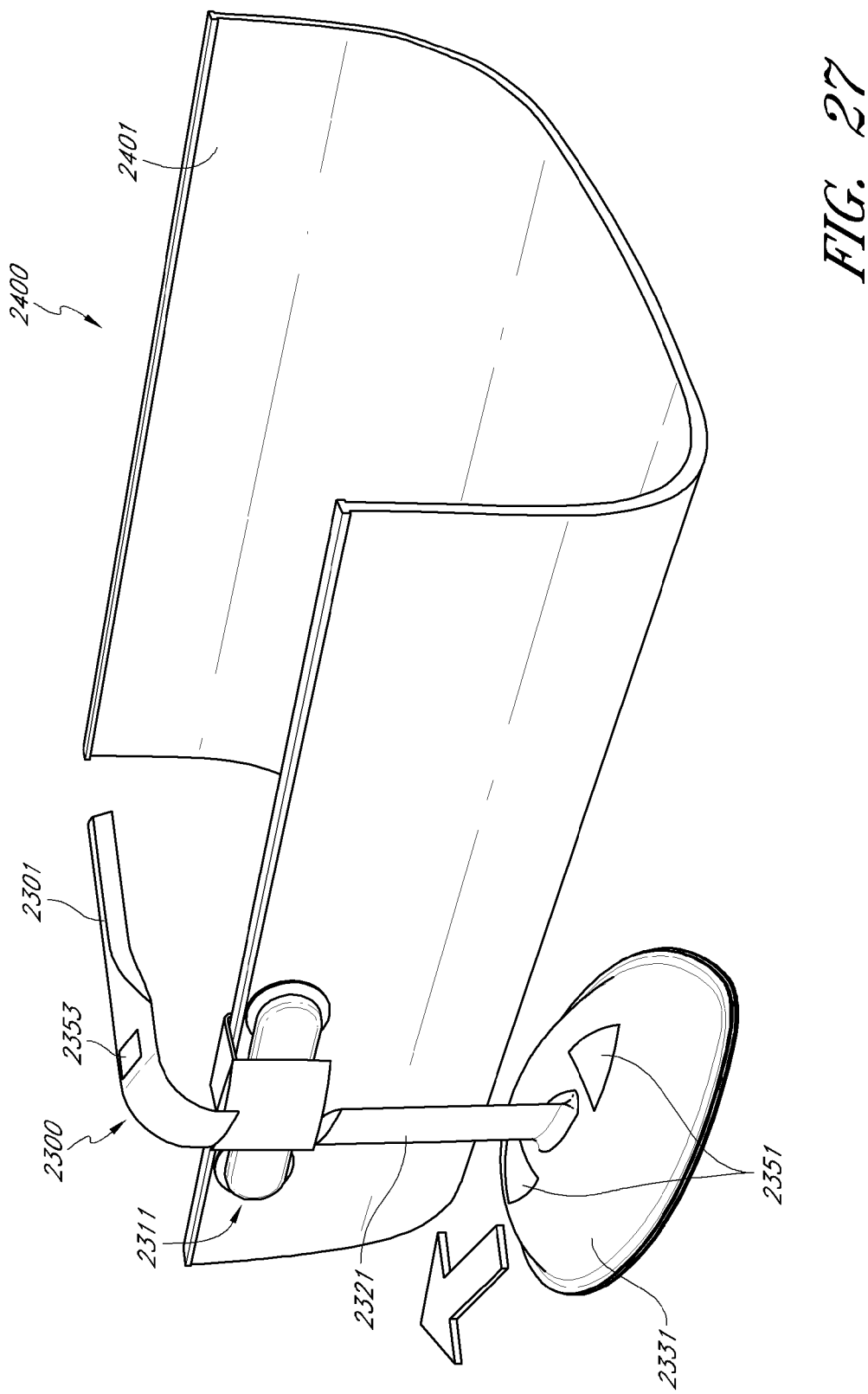
FIGS. 27-29 are top perspective views of the motorized watercraft of FIGS. 24-26 showing the motorized cassette rotated relative to the watercraft body in different configurations.
Figure 28:
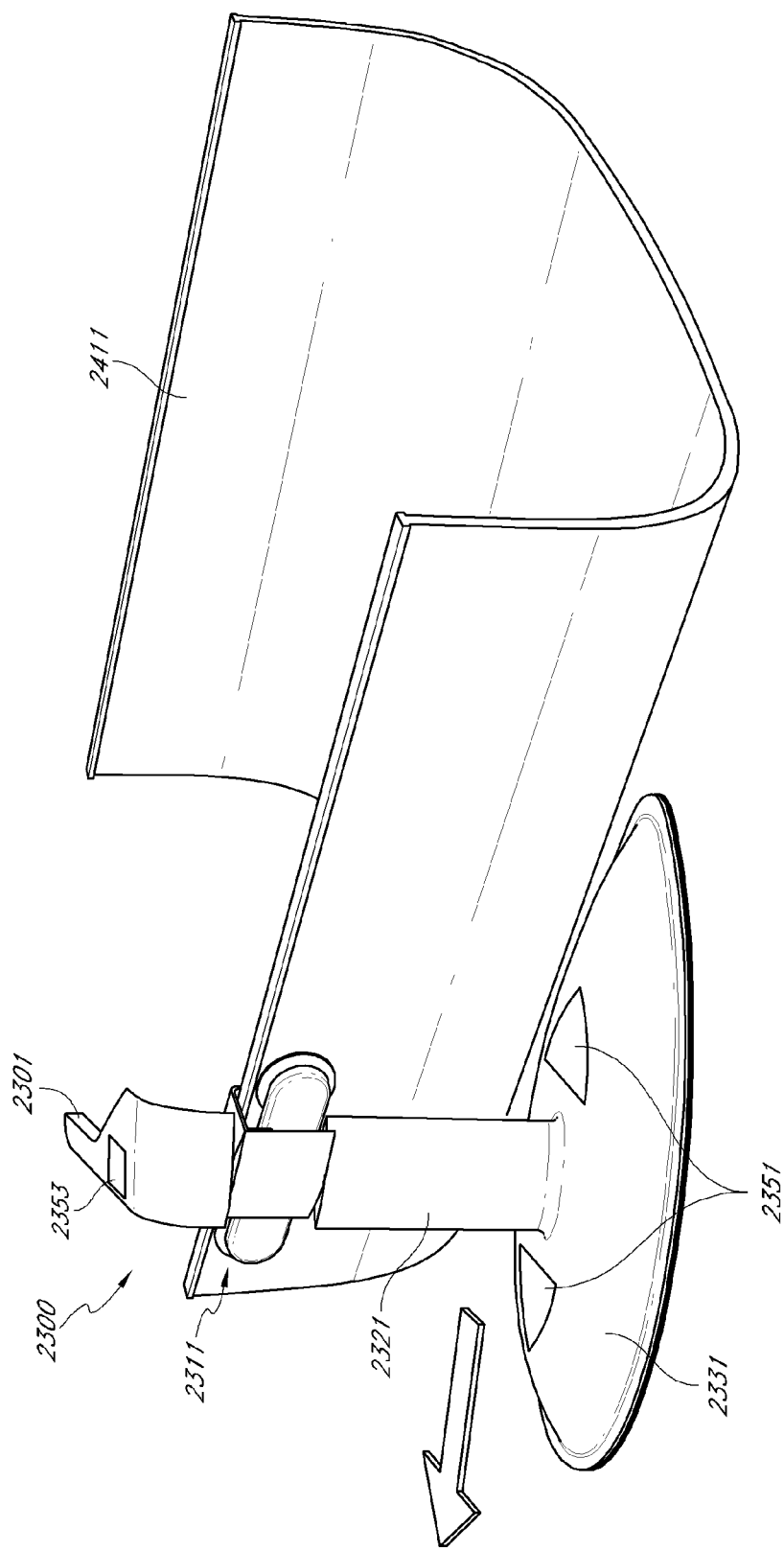
Figure 29:
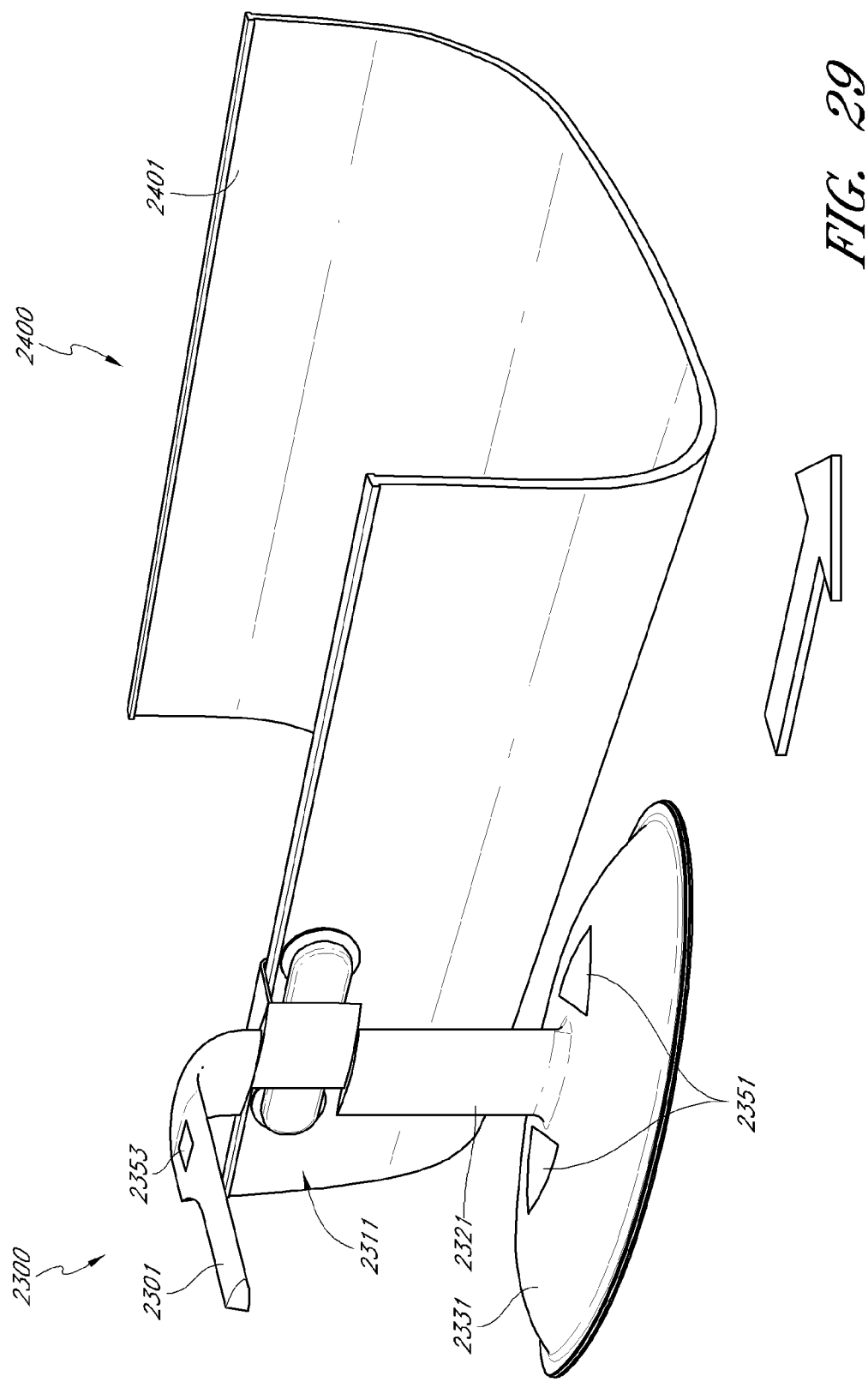

As shown in FIGS. 27-29, once the motorized cassette 2341 has been inserted into the housing 2331 and the mounting system 2300 has been secured relative to the watercraft body 2401, the tiller 2301 can be manipulated to steer the watercraft 2400 in different directions. For example, the tiller 2301 has been manipulated in FIG. 27 such that the steering column 2321 and housing 2331 have pointed the front side of the motorized cassette towards the watercraft body 2401. In such a position, the motorized cassette will steer the watercraft 2400 toward the right as shown if the motorized cassette is nearer to the bow than the stern. It will also be appreciated by one or ordinary skill in the art that if the motorized cassette is disposed nearer to the stern than the bow that the motorized cassette in FIG. 27 will steer the watercraft 2400 toward the left.

FIG. 28 shows another example of steering the watercraft 2400. In FIG. 28 the tiller 2301 has been manipulated such that the steering column 2321 and housing 2331 have pointed the front side of the motorized cassette away from the watercraft body 2401. In such a position, the motorized cassette will steer the watercraft 2400 toward the left as indicated if the motorized cassette is nearer to the bow than the stern. However, if the motorized cassette in FIG. 28 is disposed nearer to the stern than the bow, the motorized cassette will steer the watercraft 2400 toward the right. As shown in FIG. 29, the tiller 2301 may be rotated 180 degrees from the position shown in FIG. 24 such that the front side of the motorized cassette is pointed toward the stern of the watercraft 2400. In such a position, the motorized cassette will drive the watercraft 2400 in reverse (e.g., with the stern headed first). Thus, the tiller 2301 may be easily manipulated to steer the watercraft 2400 in any direction relative to a body of water.

FIGS. 23-29 show an embodiment of a watercraft that is coupled with a motorized cassette to provide motorized propulsion capability to the watercraft. In some embodiments, a motorized cassette may form at least part of a keel or other base structure of an inflatable watercraft, for example, any of the watercrafts disclosed in U.S. Pat. Nos. 4,942,839 or 6,178,911, the disclosures of which are hereby incorporated by reference in their entireties. For example, a motorized cassette can be sized and shaped so as to form a rigid base portion of an inflatable watercraft. Thus, in some embodiments, a motorized cassette incorporated in an inflatable watercraft may be sized and shaped differently than the motorized cassettes discussed above so as to provide structural support to the inflatable watercraft. Alternatively, a rigid keel structure can include one or more receptacles and/or inserts for releasably securing at least one motorized cassette relative to the keel. In some embodiments, a motorized cassette may form a portion of a base portion or keel of a watercraft and one or more inflatable chambers may be coupled to the motorized cassette to form another portion of the base portion or keel.

Figure 30:
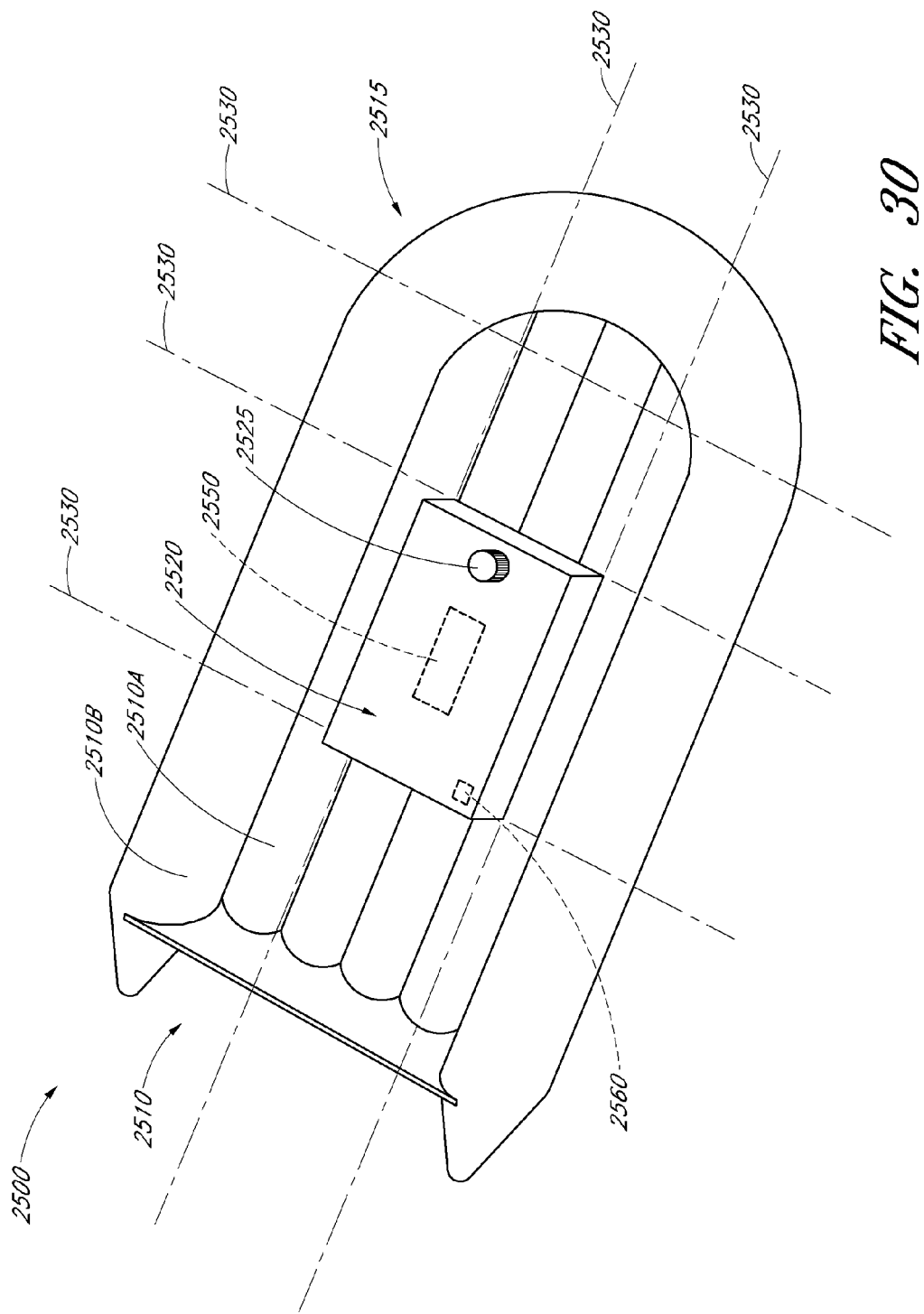
FIG. 30 is a top perspective view of one embodiment of an inflatable watercraft and a motorized cassette.

Referring to FIG. 30, in some embodiments, an inflatable watercraft 2500 can include a body 2515 comprising one or more chambers 2510 that are inflatable. Chamber 2510 can be configured to provide buoyancy to the watercraft. For example, an inflatable watercraft can include inflatable chambers disposed on opposite lateral sides (e.g., port and starboard) of the watercraft, a u-shaped chamber that extends along opposite lateral sides and the stern of the watercraft, and/or a ring shaped chamber that extends along an outer circumference of the watercraft. In some embodiments, the one or more chambers may be sized and shaped so as to provide a buoyancy to the watercraft sufficient to float over 200 kilograms in a body of water, for example, 500 kilograms. For simplicity, in some embodiments, an inflatable watercraft may include only a single inflatable chamber. Alternatively, in other embodiments, an inflatable watercraft may include a plurality of inflatable chambers that may be fluidly separated from at least one other inflatable chamber, e.g., by a valve, septum, or barrier. Separated inflatable chambers may be incorporated for safety so as to prevent a watercraft from sinking if a single chamber has been punctured and/or deflated.

In the illustrated embodiment, watercraft 2500 includes a plurality of inner inflatable chambers 2510A connected in a parallel row with respect to each other to form a base of watercraft 2500, and an additional outer chamber 2510B. Inflatable chamber 2510B can form at least a partial outer perimeter around support chambers 2510A, and/or can be approximately U-shaped. It will be understood that the embodiments of the inflatable chambers for the watercraft described herein should not be limited to that shown in FIG. 30, and any of many configurations are anticipated that provide a foldable inflatable watercraft, used in combination with a motorized cassette. For example, watercraft 2500 can include any of a number of different configurations of inflatable or non-inflatable portions. For example, 2515 can include non-inflatable portions that are still flexible, collapsible, and/or suitable to be folded along or around cassette 2520, as described further herein. It will also be understood that the inflatable chambers described herein, while generally described in the context of receiving a gas to provide buoyancy, can be configured to receive a liquid or other material to provide stability and/or counterbalance the buoyancy provided when used in combination with gas-inflated chambers. The cassette 2520 may contain at least the same components as described above with reference to FIGS. 18 and 19. As described above, the water inlet openings and water exhaust outlet openings may be provided in the bottom surface of the cassette for propelling the watercraft 2500.

The one or more inflatable chambers 2510 may be formed of one or more materials that are capable of holding a volume of gas or liquid therein, for example, rubbers, polymers, and/or coated fabrics. The inflatable chambers 2510 may be sufficiently flexible such that the inflatable watercraft may be folded or otherwise manipulated when the chambers are deflated into a deflated configuration from an inflated configuration. In some embodiments, the one or more inflatable chambers may be coupled to a motorized cassette 2520, or keel that receives a motorized cassette, such that the chambers may be compactly folded over or around the cassette 2520 when they are in the deflated configuration. In this way, the motorized cassette 2520 may be used as a guide or a base for folding the inflatable watercraft when it is in the deflated configuration. In FIG. 30, the motorized cassette 2520 is illustrated as square in shape, and this may be a suitable shape for a guide or base when folding the watercraft onto or around the motorized cassette. Any shape may be used, however. Furthermore, because no components of the watercraft drive system protrude from the housing, the motorized cassette may remain attached to the rest of the watercraft after being folded up onto or around the motorized cassette for transport or storage without risk of damage to the watercraft chambers.

Figure 31A:
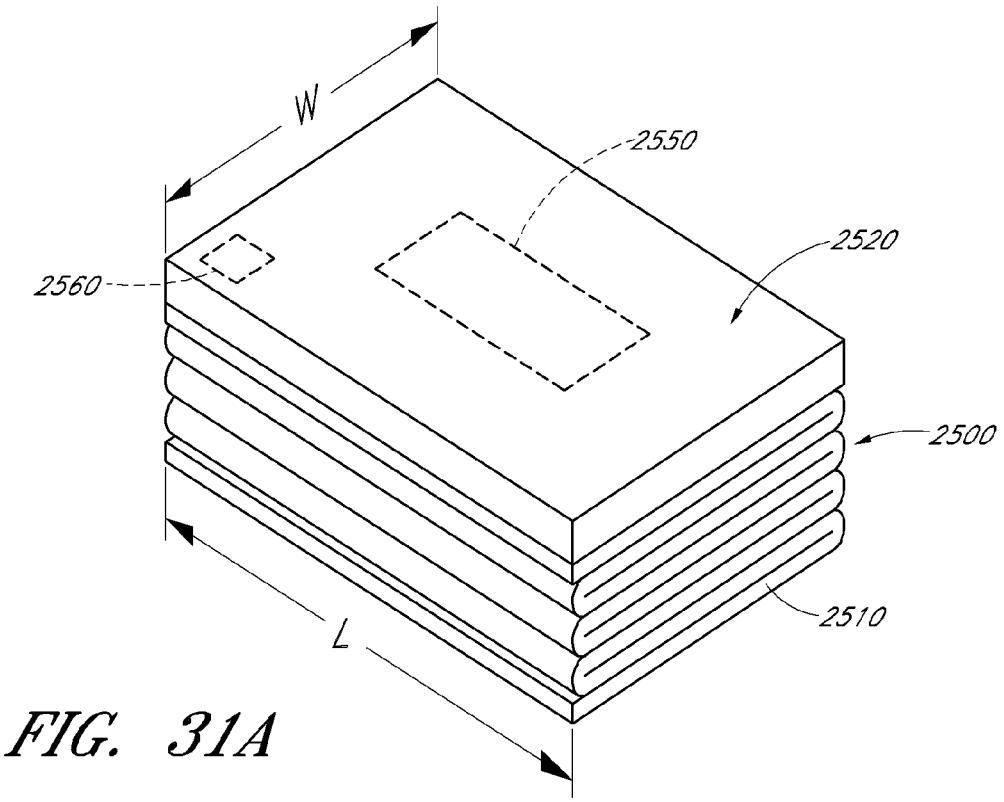
FIGS. 31A and 31B are top perspective views of the inflatable watercraft of FIG. 30 deflated and folded under a motorized cassette.
Figure 31B:
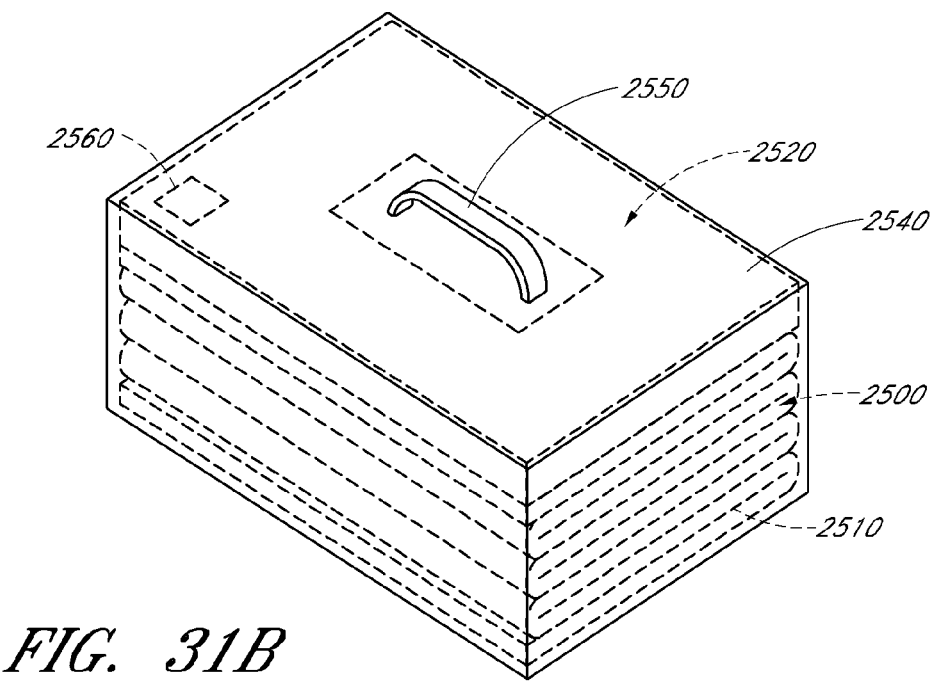

Referring to FIGS. 31A-31B, in some embodiments, the motorized cassette 2520 and one or more inflatable chambers 2510 may be sized and shaped such that the body 2515 of the inflatable watercraft 2500 can be folded onto the motorized cassette 2520 and compactly stored with the motorized cassette 2520 when the watercraft 2500 is in the deflated configuration. In some embodiments, the inflatable chambers can be biased toward the folded configuration along one or more fold lines or seams (e.g., fold lines 2530; FIG. 30; shown for illustrative purposes only) such that the inflatable watercraft is biased toward the folded configuration when the inflatable chambers are deflated. Foldable inflatable boats are shown, for example, in U.S. Pat. Nos. 4,942,839 and 5,943,978, which are incorporated herein by reference in their entireties. Accordingly, the inflatable watercraft 2500 (i.e., its body 2515) may be folded into a transportable, compact configuration, as shown in FIG. 31A, by deflating the one or more inflatable chambers 2510. It will be understood that the watercraft 2500 can be folded onto motorized cassette 2520 in any of a number of different ways. For example, watercraft 2500 can be folded such that it is positioned under cassette 2520 (as shown), positioned above cassette 2520, and/or positioned along one or more sides of cassette 2520. In some embodiments, watercraft 2500 can be folded such that it at least partially, or in some embodiments, substantially entirely, surrounds cassette 2520. In some embodiments, the watercraft 2500 can be folded such that it forms a compact configuration of approximately the same length L and width W as the cassette 2520.

Referring to FIG. 31B, when in the folded configuration, the inflatable watercraft 2500 may be stored in a bag, a case, or other readily portable compartment 2540 with the motorized cassette 2520 still attached. In some embodiments, the bag or case 2540 may itself be part of the motorized cassette 2520, or these can be separate components. A handle 2550, wheels, straps, and/or other features can be included with motorized cassette 2520, compartment 2540, and/or watercraft 2500 to facilitate handling thereof when watercraft 2500 is in a folded configuration. In some embodiments, handle 2550 can be hidden or recessed within a portion of cassette 2520, as shown in FIGS. 30 and 31A. Thus, the inflatable watercraft can be easily transported by hand when deflated and also may be stowed in a small volume on a larger watercraft or other vehicle. A charging port 2560 of the motorized cassette may be disposed along an outer surface of the folded inflatable watercraft 2500 and/or readily accessible such that the batteries of the motorized cassette may be easily charged when the inflatable watercraft is stored.

Figure 32:
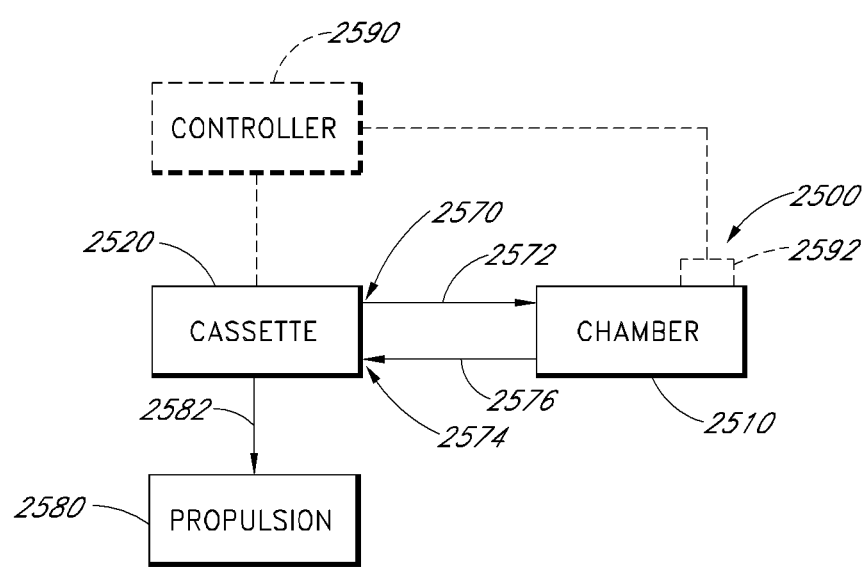
FIG. 32 is a block diagram showing one embodiment of a cassette configured to inflate and deflate one or more chambers of a watercraft.

FIG. 32 is a block diagram showing one embodiment of a cassette 2520 configured to inflate and deflate one or more chambers 2510 of a watercraft 2500. The motorized cassette 2520 can include one or more pumps configured to provide such inflation or deflation of the one or more inflatable chambers 2510. The one or more pumps can be coupled to the one or more chambers 2510 directly or via an intercommunicating valve 2525 (FIG. 30) configured to regulate the inflation and/or deflation of the chambers 2510. For example, and referring again to FIG. 32, the motorized cassette 2520 can include at least one reversible pump that is fluidly coupled by an output connection 2570 to at least one inflatable chamber 2510 so as to selectively inflate the watercraft (shown, e.g., as directional arrow 2572) and that is fluidly coupled by an input connection 2574 to at least one inflatable chamber so as to selectively deflate the watercraft (shown, e.g., as directional arrow 2576). It will be understood that output 2570, input 2574, and directional arrows 2572; 2576 are shown in FIG. 32 as separate features for illustrative purposes only. In some embodiments, a common input and output with a common flowpath can be provided between cassette 2520 and chamber 2510, to facilitate the aforementioned inflation and deflation of chamber 2510 with cassette 2520. In some embodiments, a pump disposed within a motorized cassette can be driven by a motor that also drives one or more impellers. In some embodiments, the pump can include a pump housing inside of which the one or more impellers can be positioned. Thus, the cassette can include a common motor (and also possibly a common impeller) that is utilized for inflation and/or deflation, as well as for propulsion, of the inflatable watercraft. Propulsion of the inflatable watercraft is shown schematically as block 2580 and directional arrow 2582 in FIG. 32. In other embodiments, a pump can include a separate pump motor that is powered by the one or more batteries of the motorized cassette. It is generally advantageous to include such a separate pump motor inside the cassette, although it is possible that the pump motor is positioned outside the motorized cassette, with the batteries of the motorized cassette connected to the external pump motor via cabling. With all of the above described implementations, the motorized cassette incorporated in the watercraft can propel the watercraft, inflate the watercraft, and/or deflate the watercraft.

In some embodiments, the motorized cassette 2520 can include a controller 2590 configured to regulate power distribution from the batteries. For example, the controller 2590 may prevent propulsion by the impellers and motor after a power level of the batteries is less than a threshold value such that a remaining capacity of the batteries can be utilized for deflation of the watercraft. In such instances, the watercraft can be manually propelled or propelled by a separate motor, e.g., an outboard motor or motorized cassette that is coupled to the watercraft. Similarly, the controller 2590 can receive an input from one or more pressure sensors 2592 configured to sense a pressure of the one or more inflatable chambers. In such embodiments, the controller 2590 may regulate power distribution such that the inflatable chambers are inflated if the pressure of the inflatable chambers is less than a threshold value. In some embodiments, the controller 2590 can control the aforementioned pump, valve(s) and/or impeller, to control the propulsion, inflation, and/or deflation of the watercraft 2500.

When in use, a user may unfold the watercraft, inflate one or more inflatable chambers with the motorized cassette, and propel the watercraft with the motorized cassette. After reaching a desired destination, the motorized cassette can be used to deflate the watercraft, and the deflated watercraft can be re-folded onto or around the motorized cassette for storage.

The above-described embodiments have been provided by way of example, and the present invention is not limited to these examples. Multiple variations and modifications to the disclosed embodiments will occur, to the extent not mutually exclusive, to those skilled in the art upon consideration of the foregoing description. Additionally, other combinations, omissions, substitutions and modifications will be apparent to the skilled artisan in view of the disclosure herein. Accordingly, the present invention is not intended to be limited by the disclosed embodiments.

What is claimed is:

1. An inflatable watercraft having at least an inflated configuration and a deflated configuration, the watercraft comprising:
   a motorized cassette comprising a watercraft drive system contained in a housing, the watercraft drive system comprising:
   at least one battery,
   a pump,
   a motor operatively coupled to the battery, and
   an impeller operatively coupled to the motor, wherein no components of the watercraft drive system protrude from the housing; and
   at least one inflatable chamber fluidly coupled to the pump.

2. The watercraft of claim 1, wherein the watercraft comprises a plurality of inflatable chambers.

3. The watercraft of claim 1, wherein the motorized cassette at least partially forms a base portion of the watercraft.

4. The watercraft of claim 3, wherein the motorized cassette at least partially forms a keel of the watercraft.

5. The watercraft of claim 1, wherein the pump comprises a reversible pump.

6. The watercraft of claim 1, wherein the pump is operatively coupled to the motor.

7. The watercraft of claim 1, wherein the pump comprises a pump motor.

8. The watercraft of claim 7, wherein the pump motor is operatively coupled to the at least one battery.

9. The watercraft of claim 1, wherein the pump comprises a pump housing, the impeller positioned within the pump housing.

10. The watercraft of claim 9, wherein the at least one inflatable chamber is fluidly coupled to the pump and the impeller through an exhaust port of the pump housing.

11. The watercraft of claim 1, wherein the at least one inflatable chamber is configured to fold onto or around the motorized cassette to form a portable unit comprising the watercraft and the motorized cassette at least when the watercraft is in the deflated configuration.

12. The watercraft of claim 1, wherein the motorized cassette comprises a controller configured to regulate a power distribution from the at least one battery.

13. A deflatable watercraft having at least an inflated configuration and a deflated configuration, the watercraft comprising:
   a motorized cassette comprising a watercraft drive system comprising an impeller, a motor, and a battery enclosed within a housing, wherein no components of the watercraft drive system protrude from the housing; and
   a deflatable watercraft body attached to the motorized cassette and configured to fold onto or around the motorized cassette to form a portable unit comprising the watercraft and the motorized cassette.

14. The watercraft of claim 13, wherein the motorized cassette comprises a pump, and wherein the watercraft body comprises at least one inflatable chamber fluidly coupled to the pump.

15. The watercraft of claim 14, wherein the motorized drive system forms the pump.

16. The watercraft of claim 13, further comprising a container configured to contain the motorized cassette and watercraft body when the watercraft body is folded onto the motorized cassette.

17. The watercraft of claim 16, wherein the container comprises a handle.

18. The watercraft of claim 13, wherein the housing forms at least part of a base portion of the watercraft body.

19. The watercraft of claim 18, wherein the housing comprises water inlet openings and water exhaust openings.

20. A method of operating an inflatable watercraft, comprising:
   inflating at least one inflatable chamber of a watercraft body with a pump, wherein the pump is contained within a motorized cassette attached to the watercraft body;
   propelling the watercraft with a watercraft drive system within the motorized cassette; and
   deflating the at least one inflatable chamber with the pump.

21. The method of claim 20, further comprising folding the watercraft body onto the motorized cassette.

22. The method of claim 20, wherein propelling comprises propelling the watercraft with an impeller positioned within the motorized cassette.

23. The method of claim 20, wherein inflating comprises operating the pump with a first motor, and propelling comprises propelling the watercraft with an impeller operatively connected to a second motor.

24. The method of claim 20, wherein the inflating, propelling, and deflating are performed with at least some of the same components provided in the motorized cassette.

25. A motorized cassette for a watercraft, comprising:
   a housing comprising a base attached to a cover along a perimeter to form an inner volume, wherein a vibratory weld seals the base to the cover along the perimeter;
   a watercraft drive system, comprising:
   at least one battery,
   a motor operatively coupled to the battery, and
   an impeller operatively coupled to the motor, wherein the battery and the motor are sealed within the inner volume; and
   at least one leak detector enclosed within the inner volume.

* * * * *